US006934792B1

(12) United States Patent
Nakazawa

(10) Patent No.: US 6,934,792 B1
(45) Date of Patent: Aug. 23, 2005

(54) COMPUTER SWITCH ABLE TO SWITCH CONNECTIONS BETWEEN AN INPUT DEVICE AND A PLURALITY OF COMPUTERS CONNECTED THERETO EITHER FROM THE INPUT DEVICE OR FROM THE COMPUTER

(75) Inventor: Mitsuaki Nakazawa, Tokyo (JP)

(73) Assignee: Fujitsu Takamisawa Component Limited, Tokyo (JP)

( * ) Notice: Subject to any disclaimer, the term of this patent is extended or adjusted under 35 U.S.C. 154(b) by 482 days.

(21) Appl. No.: 09/715,194

(22) Filed: Nov. 20, 2000

(30) Foreign Application Priority Data

Feb. 4, 2000 (JP) ............................ 2000-032807

(51) Int. Cl.$^{7}$ ......................... G06F 13/14; G06F 13/00

(52) U.S. Cl. ........................................ 710/316; 710/38

(58) Field of Search ................................ 710/300, 316, 710/100, 315, 38; 709/223, 224, 245, 2; 707/10; 348/222.1; 725/130; 345/700, 158; 713/202

(56) References Cited

U.S. PATENT DOCUMENTS 5,457,478 A * 10/1995 Frank ......................... 345/158
5,689,671 A * 11/1997 Stromberg .................. 709/245
5,838,300 A * 11/1998 Takagi et al. ............... 345/700
5,913,034 A * 6/1999 Malcolm .................... 709/223
5,987,135 A * 11/1999 Johnson et al. ............. 709/224
6,070,214 A * 5/2000 Ahern ........................ 710/315
6,073,188 A * 6/2000 Fleming ...................... 710/38
6,098,067 A * 8/2000 Erickson ...................... 707/10
6,308,239 B1 * 10/2001 Osakada et al. ............ 710/316
6,324,605 B1 * 11/2001 Rafferty et al. ............. 710/100
6,407,773 B1 * 6/2002 Ikeda et al. .............. 348/222.1
6,549,966 B1 * 4/2003 Dickens et al. ............. 710/300
6,557,170 B1 * 4/2003 Wilder et al. ............... 725/130

FOREIGN PATENT DOCUMENTS

JP 357069338 A * 4/1982 ............. G06F 9/00
JP 363211847 A * 9/1988 ........... H04L 13/00
JP 2-135559 5/1990
JP 08115284 A * 5/1996 ........... G06F 13/00
JP 11-65723 3/1999

* cited by examiner

*Primary Examiner*—Glenn A. Auve
*Assistant Examiner*—Christopher E. Lee
(74) *Attorney, Agent, or Firm*—Staas & Halsey LLP

(57) ABSTRACT

A computer switch, for connecting an input device to a plurality of computers, which comprises a switching-command receiving unit for selecting from a plurality of computers a desired computer other than a computer which is currently actively connected with the input device and for receiving a switching command, which activates the connection between the desired computer and the input device, from the computer, which is currently actively connected with the input device, and a switching unit for activating connection from the input device to the computer corresponding to the switching command after the switching command is received.

8 Claims, 15 Drawing Sheets

START

TRANSMISSION OF CONNECTING-SOURCE IDENTIFIER ACQUISITION COMMAND BY COMPUTER — 101

RECEPTION OF CONNECTING-SOURCE IDENTIFIER ACQUISITION COMMAND BY COMPUTER SWITCH — 102

TRANSMISSION OF CONNECTING-SOURCE IDENTIFIER BY COMPUTER SWITCH — 103

ACQUISITION OF CONNECTING-SOURCE IDENTIFIER BY COMPUTER — 104

INDICATION ON SCREEN OF DISPLAY FOR COMPUTER — 105

END 1
14
12
TO KEYBOARD
13a
13b
13c
13d
11a
11b
11c
11d
TO EACH COMPUTER 1
51
SWITCHING-COMMAND RECEIVING UNIT
52
SWITCHING UNIT
53
CONNECTING-CHANNEL IDENTIFIER ACQUISITION COMMAND RECEIVING UNIT
54
CONNECTING-CHANNEL IDENTIFIER TRANSMITTING UNIT
55
CONNECTING-CHANNEL IDENTIFIER STORING UNIT
TO EACH COMPUTER 1
55
CONNECTING-CHANNEL IDENTIFIER STORING UNIT
53
CONNECTING-CHANNEL IDENTIFIER ACQUISITION COMMAND RECEIVING UNIT
54
CONNECTING-CHANNEL IDENTIFIER TRANSMITTING UNIT
TO EACH COMPUTER

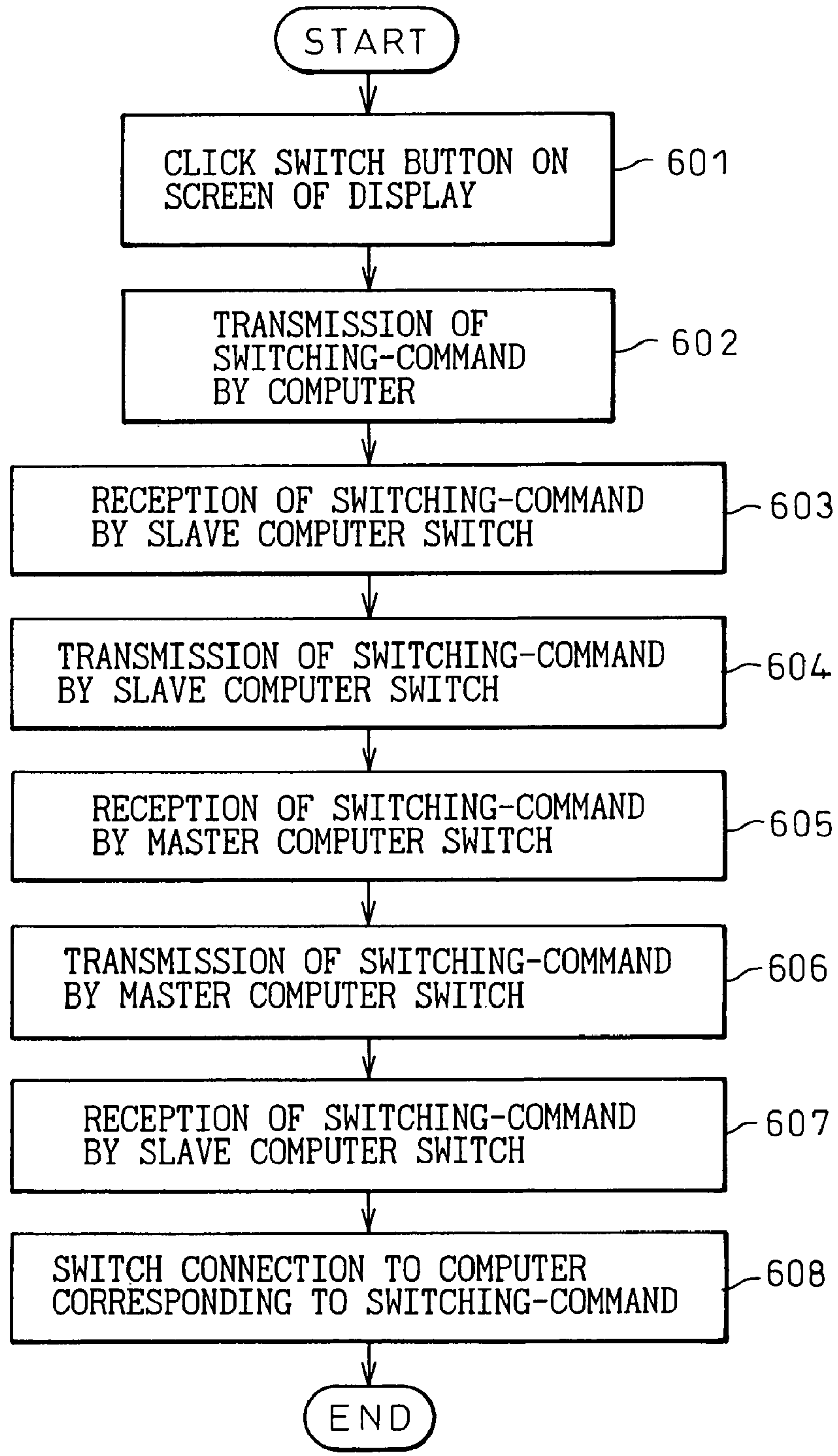
Fig.15
START
CLICK SWITCH BUTTON ON SCREEN OF DISPLAY
601
TRANSMISSION OF SWITCHING-COMMAND BY COMPUTER
602
RECEPTION OF SWITCHING-COMMAND BY SLAVE COMPUTER SWITCH
603
TRANSMISSION OF SWITCHING-COMMAND BY SLAVE COMPUTER SWITCH
604
RECEPTION OF SWITCHING-COMMAND BY MASTER COMPUTER SWITCH
605
TRANSMISSION OF SWITCHING-COMMAND BY MASTER COMPUTER SWITCH
606
RECEPTION OF SWITCHING-COMMAND BY SLAVE COMPUTER SWITCH
607
SWITCH CONNECTION TO COMPUTER CORRESPONDING TO SWITCHING-COMMAND
608
END 1
12
14
KB MICROCOMPUTER
15
DATA
SEL
RDY
OUT
KB_ACK
IRQ
PC_ACK
13a
PC MICROCOMPUTER
11a

COMPUTER SWITCH ABLE TO SWITCH CONNECTIONS BETWEEN AN INPUT DEVICE AND A PLURALITY OF COMPUTERS CONNECTED THERETO EITHER FROM THE INPUT DEVICE OR FROM THE COMPUTER

BACKGROUND OF THE INVENTION

1. Field of the Invention

The present invention relates to a computer switch for selecting a desired computer from a plurality of computers connected to an input device and for switching the connected state.

2. Description of the Related Art

With the significant progress of the performance of computers, the range of utilization of computers has been becoming wider. In recent years, especially, there has been an increasing tendency for private users to have a plurality of computers and use such computers in different work environments, respectively. In such a case, usually, a set of input devices, such as a mouse and a keyboard, is connected to a plurality of computers through a computer switch thereby to save space and to minimize costs.

A computer switch is connected between an input device and each of plural computers and is operative to activate the connection therebetween. The use of this computer switch allows a user to select from the plural computers a computer to be connected to the input device and to then use the selected computer.

A conventional computer switch has a built-in changeover switch. A user manually operates the changeover switch to thereby select a computer to be connected to an input device.

Further, there has been another conventional computer switch that is operated by using a keyboard as an input device and performing a predetermined key operation. In this case, a specific key code outputted from the keyboard by performing the predetermined key operation is assigned to a switching operation of the computer switch.

The computer switch is usually installed some distance from a workbench on which the computers and the input device are placed. That is, the computer switch is often disposed at a difficult-to-find place for a user, for example, under the workbench or behind the computers. In such a case, a manual operation of the changeover switch on the computer switch is very inconvenient. Further, working efficiency is low. Furthermore, generally, the computer switch has an indicator (for instance, an LED) indicating a plurality of computers to be connected by this computer switch to the input device, and indicating that one of the plurality of computers, which is currently actively connected with the input device and thus available. However, in the case that the computer switch is installed at a difficult-to-find place for a user, it is difficult to recognize the indication state of the indicator provided on the computer switch.

Further, even in the case that the computer switch is installed at a visible place for the user who uses the computers by simultaneously watching the screen of a display device, the user must take his eyes off the screen when the user manually operates the changeover switch provided on the computer switch. Thus, the working efficiency is low.

On the other hand, in the case that the computer switch is operated by performing the predetermined key operation on the keyboard, the computer switch may be placed anywhere. However, when the indicator provided on the computer switch indicates the computer connected to the input device and is not installed at a visible place for the user, the computer switch is inconvenient for the user, as in the case of manually operating the changeover switch provided on the computer switch.

Moreover, in both the case where a computer switching operation of the conventional computer switch is performed by manually operating the changeover switch provided thereon, and the case where the computer switching operation thereof is performed by performing the predetermined key operation through the use of the keyboard, operations for switching the computer are performed only from the computer switch side. That is, such computer switching operations cannot be performed from the computer side.

Therefore, although the computer switch is connected to a plurality of computers as described above, the computers cannot identify the channels to which the computers are connected. To verify the connecting state of each of the computers, there is no other way but to trace a cable connected between the computer switch and each of the computers.

Furthermore, in the case of using the conventional computer switch, the transmission/reception of signals is achieved only between the input device and the computer that is in active connection therewith, whereas the transmission/reception of signals cannot be performed between the input device and any of the other computers, namely, the computers that are not actively connected with the input device.

SUMMARY OF THE INVENTION

Accordingly, in view of the drawbacks of the conventional computer switch, a first object of the present invention is to provide a computer switch that enables any of a plurality of computers, which are connected to an input device, to easily perform a switching operation.

Further, in view of the drawbacks of the conventional computer switch, a second object of the present invention is to provide a computer switch that enables any of a plurality of computers, which are connected to an input device, to identify a connecting channel therefrom to the input device.

Moreover, in view of the drawbacks of the conventional computer switch, a third object of the present invention is to provide a computer switch that enables the transmission/reception of data among a plurality of computers connected to an input device.

To achieve the first object, according to a first aspect of the present invention, there is provided a computer switch for connecting an input device to a plurality of computers, which comprises switching-command receiving unit for selecting from a plurality of computers a desired computer, other than a computer which is currently actively connected with the input device, and for receiving a switching command which activates the connection between the desired computer and the input device, from the computer which is currently actively connected with the input device, and switching unit for activating connection from the input device to the computer corresponding to the switching command after receiving the switching command.

Further, to achieve the second object, according to a second aspect of the present invention, there is provided a computer switch for connecting an input device, to a plurality of computers, which comprises connecting-channel identifier acquisition command receiving unit for receiving, from the computer which is currently actively connected with the input device, a connecting-channel identifier acquisition command which requests acquisition of a connecting-channel identifier corresponding to a connecting channel for the computer that is currently actively connected with the input device. This computer switch further comprises connecting-channel identifier acquisition command receiving unit for transmitting the corresponding connecting channel identifier, to the computer which is currently actively connected with the input device, after the connecting-channel identifier acquisition command is received.

Furthermore, to achieve the third object, according to a third aspect of the present invention, there is provided a computer switch for connecting an input device, to a plurality of computers, which comprises first receiving unit, for receiving a data acquisition command which is transmitted from a first computer so that the first computer acquires data retained by a second computer that is other than the first computer of the plurality of computers and a computer identifier corresponding to the second computer from the first computer, first transmitting unit for transmitting the data acquisition command to the second computer after the computer identifier and the data acquisition command are received, second receiving unit for receiving from the second computer the data retained by the second computer after the second computer receives the data acquisition command, and second transmitting unit for transmitting the data retained by the second computer to the first computer after the data is received.

In the case of the computer switch according to the first aspect of the present invention, a switching operation can easily performed by any of the plurality of computers connected to the input device.

In the case of the computer switch according to the second aspect of the present invention, any of the plurality of computers connected to the input device can identify a connecting channel used therefor.

In the case of the computer switch according to the third aspect of the present invention, the transmission/reception of data is achieved among the plurality of computers connected to the input device.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 15 is a flowchart illustrating a computer switching operation in the case of cascaded computer switches.

DESCRIPTION OF THE PREFERRED EMBODIMENTS

Figure 1:
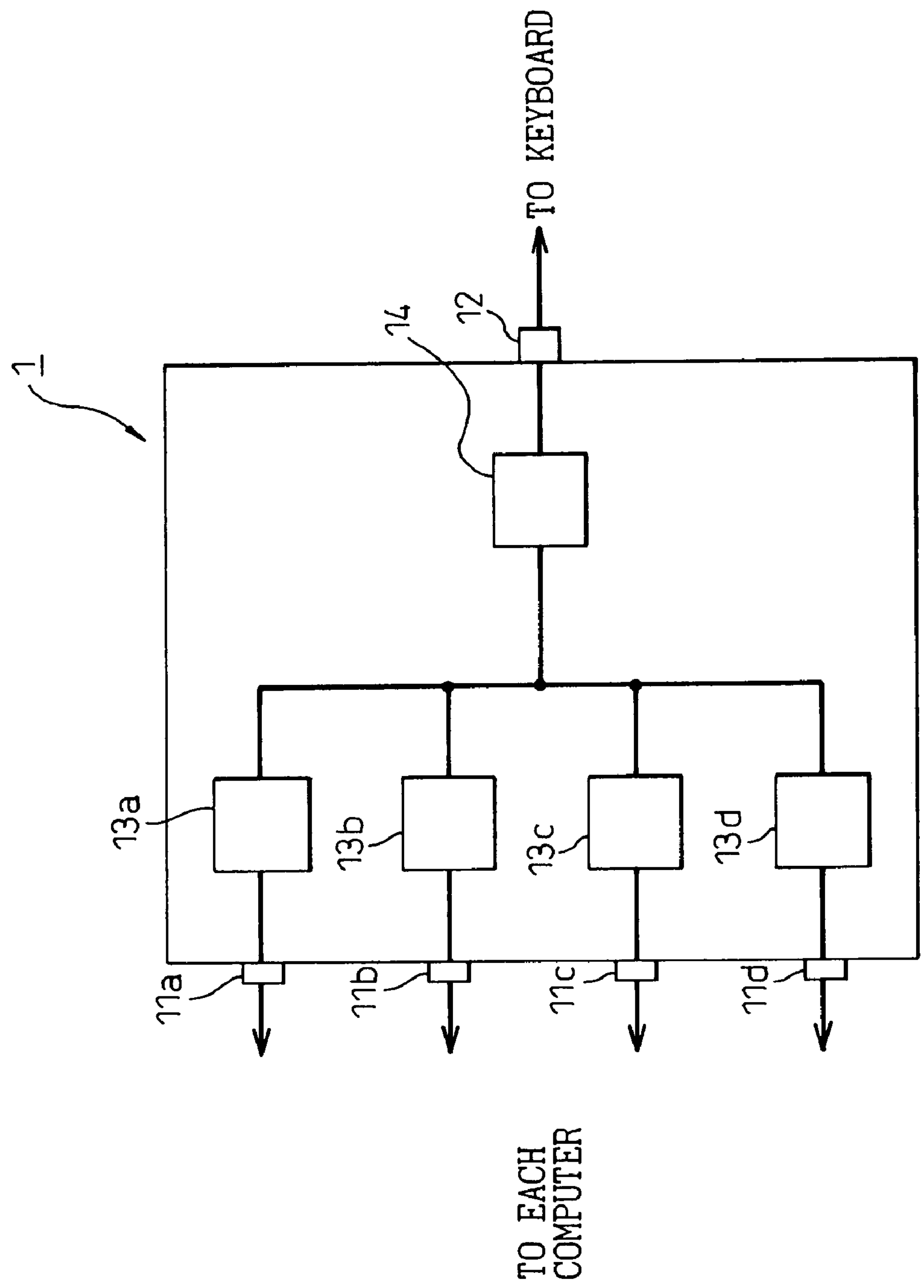
FIG. 1 is a schematic diagram illustrating the internal constitution of a computer switch according to the present invention.

FIG. 1 is a schematic diagram illustrating the internal constitution of a computer switch according to the present invention.

The computer switch of the present invention has a computer switching function of transmitting a switching command to command the switching of computers, a connecting-channel identification function of identifying a computer connecting channel used therein correspondingly to each of the computers, and a connecting channel inspection function of successively inspecting the connecting states of the computers therein. Incidentally, computer switches each having only one of the functions can be realized.

As illustrated in FIG. 1, a computer switch 1 of the present invention has a plurality of connecting channels 11*a*, 11*b*, 11*c*, and 11*d* for connecting the computers to the computer switch 1, a connecting channel 12 for connecting an input device, such as a keyboard or a mouse, dedicated microcomputers (hereunder referred to as PC microcomputers) 13*a*, 13*b*, 13*c*, and 13*d*, which are respectively provided corresponding to the plurality of connected computers, and a microcomputer (hereunder referred to as KB microcomputer) 14 dedicated to operations of the input device, as shown in FIG. 1. Each of the PC microcomputers 13*a*, 13*b*, 13*c*, and 13*d* is connected to the KB microcomputer 14, and contains a memory (not shown).

Each of the PC microcomputers 13*a*, 13*b*, 13*c*, and 13*d* in the computer switch is supplied with power from the computer connected thereto. Moreover, it is sufficient for the KB microcomputer 14, which is provided for the input device's exclusive use, to be supplied with power from at least one of the PC microcomputers 13*a*, 13*b*, 13*c*, and 13*d*.

Although the maximum number of computers to be connected to the computer switch 1 of the present invention is 4 and thus four computer connecting channels 11*a*, 11*b*, 11*c*, and 11*d* are provided therein, the number of computer connecting channels of the computer switch according to the present invention is not limited thereto. Further, the computer switches 1 of the present invention may be cascaded, as will be described later.

Incidentally, in the following description, four computers A, B, C, and D (not shown) are connected to the four computer connecting channels 11*a*, 11*b*, 11*c*, and 11*d* of the computer switch 1, unless otherwise specified.

According to the computer switch 1 of the present invention, a switching operation is achieved by any of the plurality of computers connected to the input device. Various functions of performing a computer switching operation, a connecting-channel identification operation, and a data transfer operation (to be described later) are performed by executing control software programs, which are used in combination with the computer switch of the present invention and installed on each of the computers, in each of the PC microcomputers and the KB microcomputer provided in the computer switch 1. Incidentally, the functions to be performed in each of the connected computers may be performed by firmware instead of the aforementioned control software programs.

Generally, an operating system employs a GUI (Graphical User Interface) so as to enhance the operability of a computer. Although this embodiment uses Microsoft's Windows 98/95 (Windows 95 and Windows 98 are registered trademarks of Microsoft Corporation) widely used as operating systems in the computers to be connected to the computer switch, the present invention is applicable to all other operating systems.

The computer switch, which is the first embodiment of the present invention, will be described hereinbelow.

Figure 2:
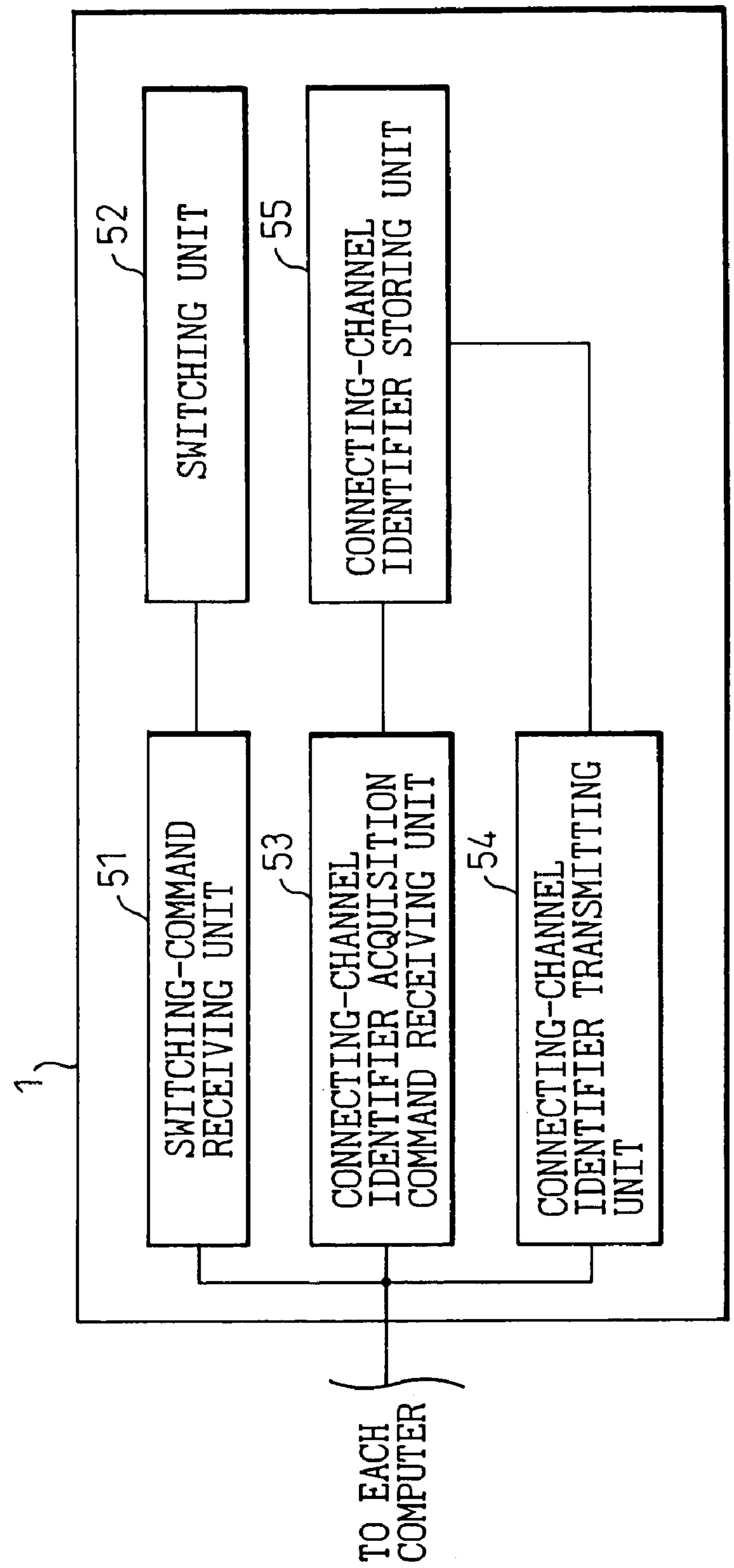
FIG. 2 is a schematic block diagram illustrating a computer switch that is a first embodiment of the present invention.

FIG. 2 is a schematic block diagram illustrating the computer switch that is the first embodiment of the present invention.

The computer switch 1 for connecting the input device to a plurality of computers comprises switching-command receiving unit 51 for selecting from a plurality of computers a desired computer, other than a computer which is currently actively connected with the input device, and for receiving a switching command which activates the connection between the desired computer and the input device from the computer which is currently actively connected with the input device. The computer switch 1 further comprises switching unit 52 for activating connection from the input device to the computer corresponding to the switching command after the switching command is received, and connecting-channel identifier acquisition command receiving unit 53 for receiving, from the computer which is currently actively connected with the input device, a connecting-channel identifier acquisition command, which requests the acquisition of a connecting-channel identifier corresponding to a connecting channel for the computer that is currently actively connected with the input device, connecting-channel identifier acquisition command receiving unit 54 for transmitting the corresponding connecting channel identifier to the computer which is currently actively connected with the input device, after the connecting-channel identifier acquisition command is received, and connecting-channel identifier storing unit 55 for storing the connecting-channel identifier.

Each of such unit is implemented by executing control software programs, which are used in combination with the computer switch of the present invention and installed on each of the computers, in each of the PC microcomputers and the KB microcomputer, which are provided in the computer switch 1 will be described later with reference to the drawings.

This embodiment of the present invention has a computer switching function, a connecting-channel identification function, and a connecting-channel inspection function. However, each function may be performed singly.

Figure 3:
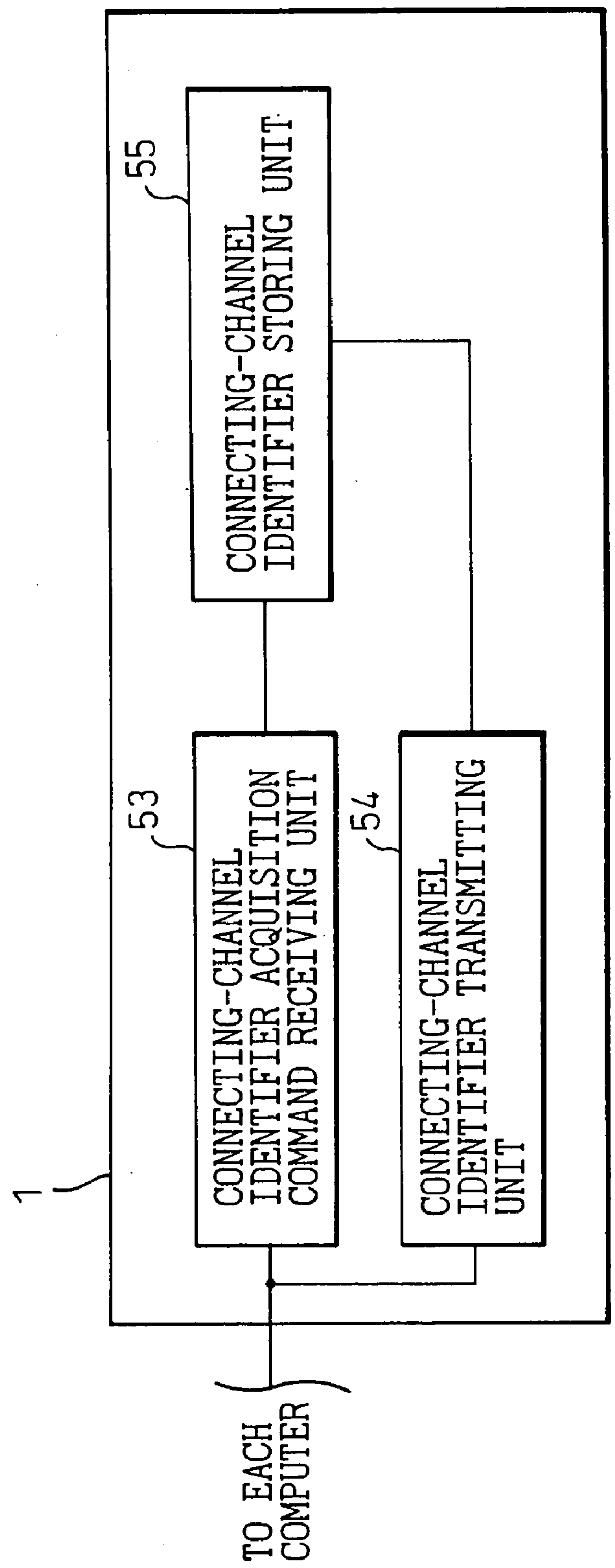
FIG. 3 is a schematic block diagram illustrating a modification of the computer switch that is the first embodiment of the present invention.

FIG. 3 is a schematic block diagram illustrating a modification of the computer switch that is the first embodiment of the present invention.

This modification is adapted to singly perform the connecting-channel identification function according to the present invention. Further, this modification comprises connecting-channel identifier acquisition command receiving unit 53 for receiving, from the computer which is currently actively connected with the input device, a connecting-channel identifier acquisition command which requests the acquisition of a connecting-channel identifier corresponding to a connecting channel for the computer that is currently actively connected with the input device, connecting-channel identifier acquisition command receiving unit 54 for transmitting the corresponding connecting-channel identifier, to the computer which is currently actively connected with the input device, after the connecting-channel identifier acquisition command is received, and connecting-channel identifier storing unit 55 for storing the connecting-channel identifier.

First, a processing operation of the first embodiment of the present invention will be described hereunder.

In each of the computers to be connected to the computer switch 1 of the present invention, a control software program according to this embodiment of the present invention is pre-installed. When the computer switch 1 is used, the control software program according to this embodiment of the present invention is activated in each of the computers. A computer switching operation using the computer switch 1 cannot be utilized until the control software program is activated.

An operation of each of the PC microcomputers 13*a*, 13*b*, 13*c*, and 13*d* and the KB microcomputer 14 will be described in detail later.

When a computer is connected to one of the computer connecting channels 11*a*, 11*b*, 11*c*, and 11*d* of the computer switch 1 and the power supply for the computer is turned on, the power supply starts supplying power to the PC microcomputer corresponding to the computer connecting channel to which the computer is connected.

When the control software program according to this embodiment is activated, the connecting channel identification function, for identifying the computer connecting channel to which the computer is connected, of the computer switch 1 is first performed.

The connecting channel identification operation according to the first embodiment of the present invention comprises a connecting channel identifier command receiving step, at which a connecting channel identifier acquisition command to request the acquisition of a connecting channel identifier corresponding to the computer currently actively connected with the input device is received from the computer that is currently actively connected with the input device, and a connecting channel identifier transmitting step, at which a corresponding connecting channel identifier is transmitted, to the computer which is currently actively connected with the input device, after the connecting channel identifier acquisition command is received. Processing unit to be used at each of these steps are the control software programs, which are used in combination with the computer switch of the present invention and installed on each of the computers, and the PC microcomputers and the KB microcomputer that are provided in the computer switch 1 and will be described later by referring to the drawings.

Figure 4:
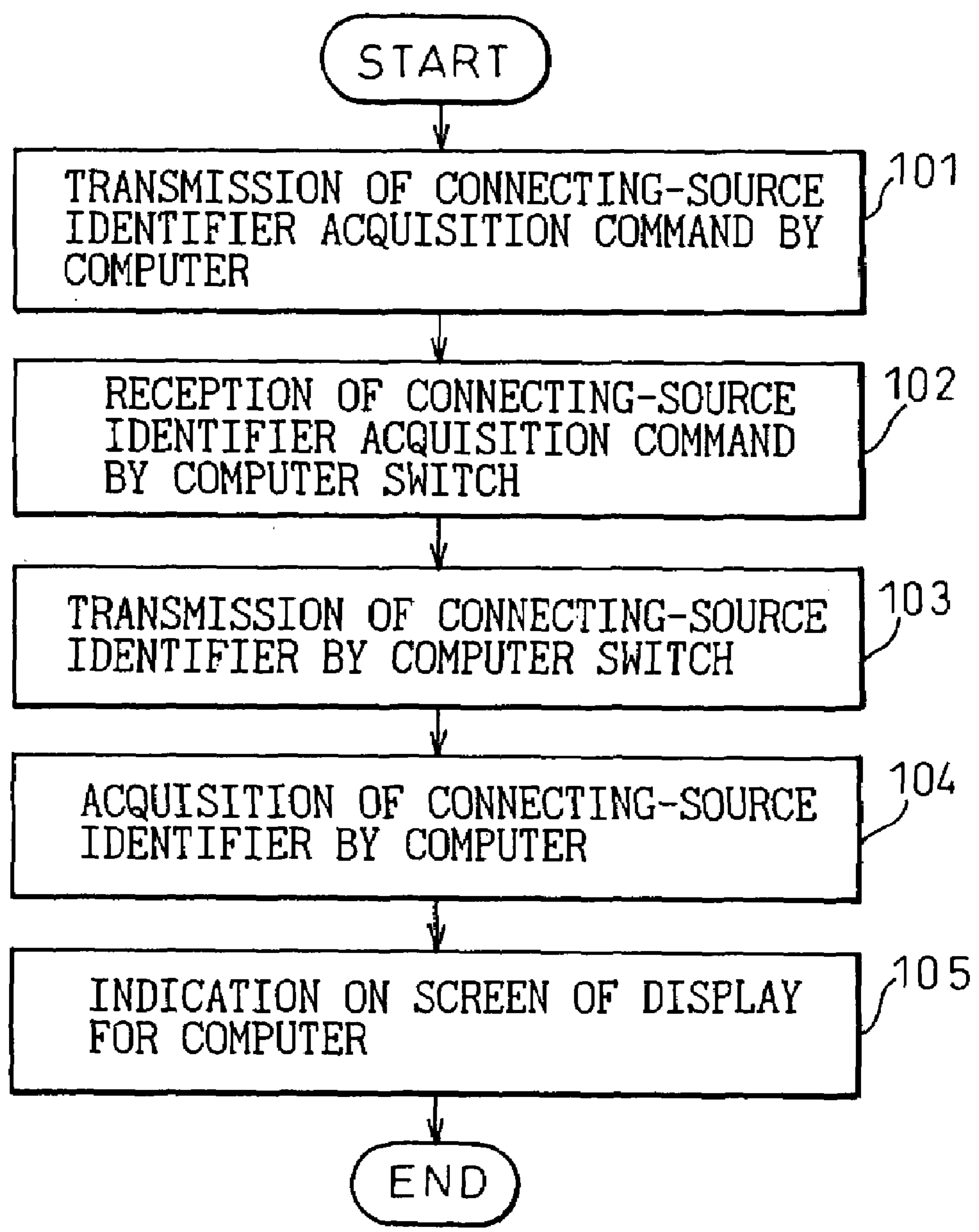
FIG. 4 is a flowchart illustrating a connecting-channel identification operation of the first embodiment of the present invention.

FIG. 4 is a flowchart illustrating a connecting-channel identification operation of the first embodiment of the present invention.

First, as illustrated in step 101, the currently used computer transmits to the computer switch 1 a connecting channel identifier command, which requests the acquisition of a connecting channel identifier assigned to the computer connecting channel in the computer switch 1. The connecting channel identifier acquisition command is 1 byte long.

The connecting channel identifier represents information indicating which of the computing connecting channels 11*a*, 11*b*, 11*c*, and 11*d* each of the computers is connected to. Further, this connecting channel identifier is preliminarily assigned to each of the computer connecting channels. In this embodiment, the maximum number of computers connectable to the computer switch 1 is 4. Thus, this embodiment has four connecting channel identifiers. Each of the connecting channel identifiers is stored in a memory of a corresponding one of the PC microcomputers 13*a*, 13*b*, 13*c*, and 13*d* that serve as connecting channel identifier storing unit and correspond and are connected to the computer connecting channels 11*a*, 11*b*, 11*c*, and 11*d*, respectively.

When the computer switch 1 receives a connecting channel identifier acquisition command at step 102, the computer switch 1 transmits, to the computer which is currently used, a connecting channel identifier, which corresponds to the computer connecting channel connected thereto, at step 103.

Then, the currently used computer receives the connecting channel identifier at step 104. Subsequently, at step 105, the currently used computer indicates the received identifier on the screen of the display device by performing a method (to be described later).

When the software program according to the present invention is activated, this connecting channel identification function is performed without exception. The connecting channel identifier is provided to each of the computers through this connecting-channel identification operation. Thus, the connecting state of each of the computer is clearly indicated. That is, it is clearly indicated which of the computer connecting channels each of the computers is connected to.

Incidentally, in the computer that is actively connected with the computer switch 1 and that is currently available, the connecting channel inspection function (to be described later) is automatically performed at predetermined time intervals. Thus, this embodiment keeps track of the connected state of each of the computers other than the currently available computer and indicates the connected state thereof on the screen of the display device for the currently used computer in a display format that will be described hereinbelow.

Figure 5:
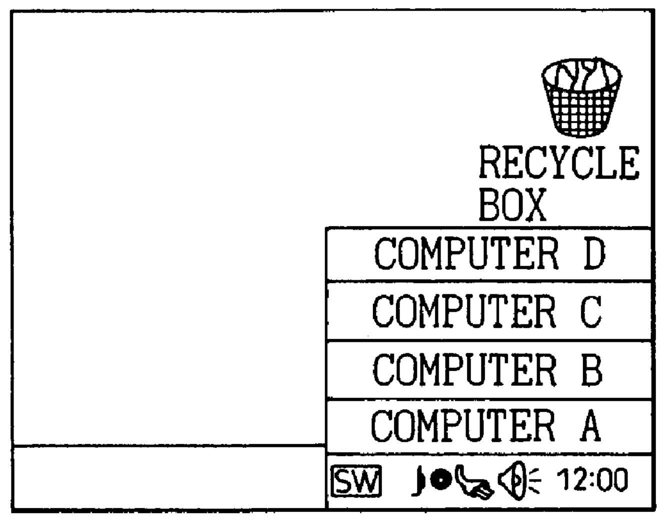
FIG. 5 is a diagram illustrating an indication on the screen of a display device after the connecting-channel identification operation is performed by the first embodiment of the present invention.

FIG. 5 is a diagram illustrating an indication on the screen of the display device after the connecting-channel identification operation is performed by the first embodiment of the present invention.

In this embodiment, the connected state of the computer connected to the computer switch 1 is displayed on the screen of the display device in a pop-up/pull-down menu format according to the connecting channel identifier assigned to the computer through the connecting channel identification function performed at the steps 101 to 104, as illustrated in FIG. 5.

In the case where there is a computer connecting channel that is not connected to a computer, an area for indicating the computer connecting channel in the pop-up/pull-down menu format is explicitly displayed by being dimmed (or grayed), as compared with other areas. The presence/absence of a computer connecting channel not connected to a computer is determined at the time of performing the connecting channel inspection function.

Incidentally, in FIG. 5, the four computers A, B, C, and D connected to the computer connecting channels of the computer switch 1 are respectively designated on the screen of the display device as “COMPUTER A”, “COMPUTER B”, “COMPUTER C”, and “COMPUTER D”. However, as will be described in detail, other designations may be assigned to the four computers A, B, C, and D.

This pop-up/pull-down menu may be indicated anywhere on the screen of the display device for the computer. For example, in FIG. 5, this menu is indicated in the lower right corner of the screen of the display device. Further, although the pop-up/pull-down menu is always displayed thereon in this embodiment, this menu may be displayed only in a desired time period. In this case, this menu is indicated or deleted, for instance, when a predetermined key operation is performed by using a keyboard, or when a mouse button is clicked on a predetermined icon. For example, the pop-up/pull-down menu may be indicated when a mouse cursor is moved to the start button on the Windows desktop taskbar.

Only one of the four computers A, B, C, and D connected to the computer switch 1 is actively connected with the computer switch 1 and is thus available. In this embodiment, this currently available computer is explicitly indicated by a check mark on the pop-up/pull-down menu. As shown in FIG. 5, a check mark is placed, for instance, on the designation “COMPUTER A”. Thus, a user can easily know the currently available computer by watching this indication on the screen. Incidentally, although the currently available computer is explicitly indicated by using a check mark in this embodiment, other methods may be used, as long as such methods can identify the currently available computer. For instance, such a computer may be explicitly indicated by changing the color of characters used for the indication.

The indication of the connecting state of the computer on the screen of the display device may be performed only by the display device corresponding to the currently available computer. However, the connecting state may be indicated on the screens of the display devices respectively corresponding to all or some of the computers that are connected to the computer switch and are supplied with power.

Although the connecting state of each of the computers connected to the computer switch 1 is indicated in the pop-up/pull-down menu format in this embodiment as shown in FIG. 5, the connecting state may be indicated by using other formats, as long as the identification of the computer is achieved by such methods.

Figure 6:
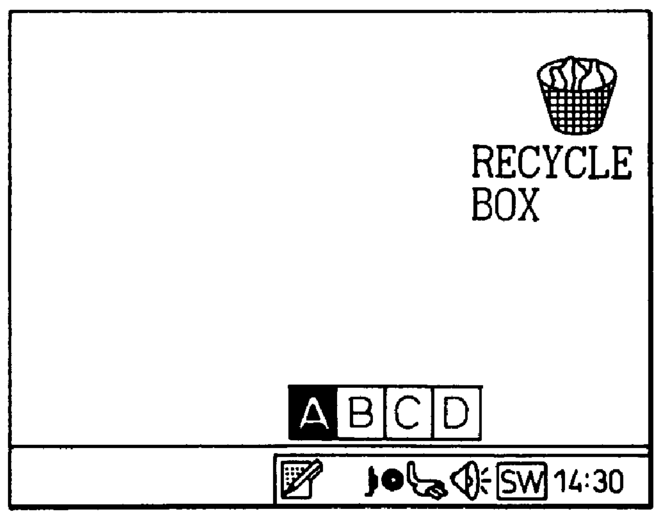
FIG. 6 is a diagram illustrating an alternative indication on the screen of the display device after the connecting-channel identification operation is performed.

FIG. 6 is a diagram illustrating an alternative indication on the screen of the display device after the connecting-channel identification operation is performed.

In the case of this alternative indication, the connecting state of the computer connected to the computer switch 1 is indicated in a button bar format on the screen of the display device. As shown in FIG. 6, the computers to be connected to the computer switch 1 are denoted by characters “A”, . . . , “D”, respectively. In the case that there is a computer connecting channel not connected to a computer, the area for indicating the computer connecting channel is explicitly displayed by being dimmed (or grayed), in comparison with other areas, as in the case of using the pop-up/pull-down menu format.

This button bar may be displayed anywhere on the screen of the display device for the computer. For example, as shown in FIG. 6, this button bar may be indicated in the lower right corner of the screen of the display device. Further, this button bar may be indicated on the screen of the display device at all times or only in a predetermined time period, as in the case of the first embodiment. The connecting state of the currently available is explicitly indicated by being inverted. In the case of the alternative indication of FIG. 6, character "A" is displayed by being reversed. Thus, a user using the computer and watching the screen of the display device can easily know the currently available computer.

Such indication of the connecting state of the computer on the screen of the display device may be performed only by the display device corresponding to the currently available computer. However, the connecting state may be indicated on the screens of the display devices respectively corresponding to all or part of the computers that are connected to the computer switch and supplied with power.

Figure 7:
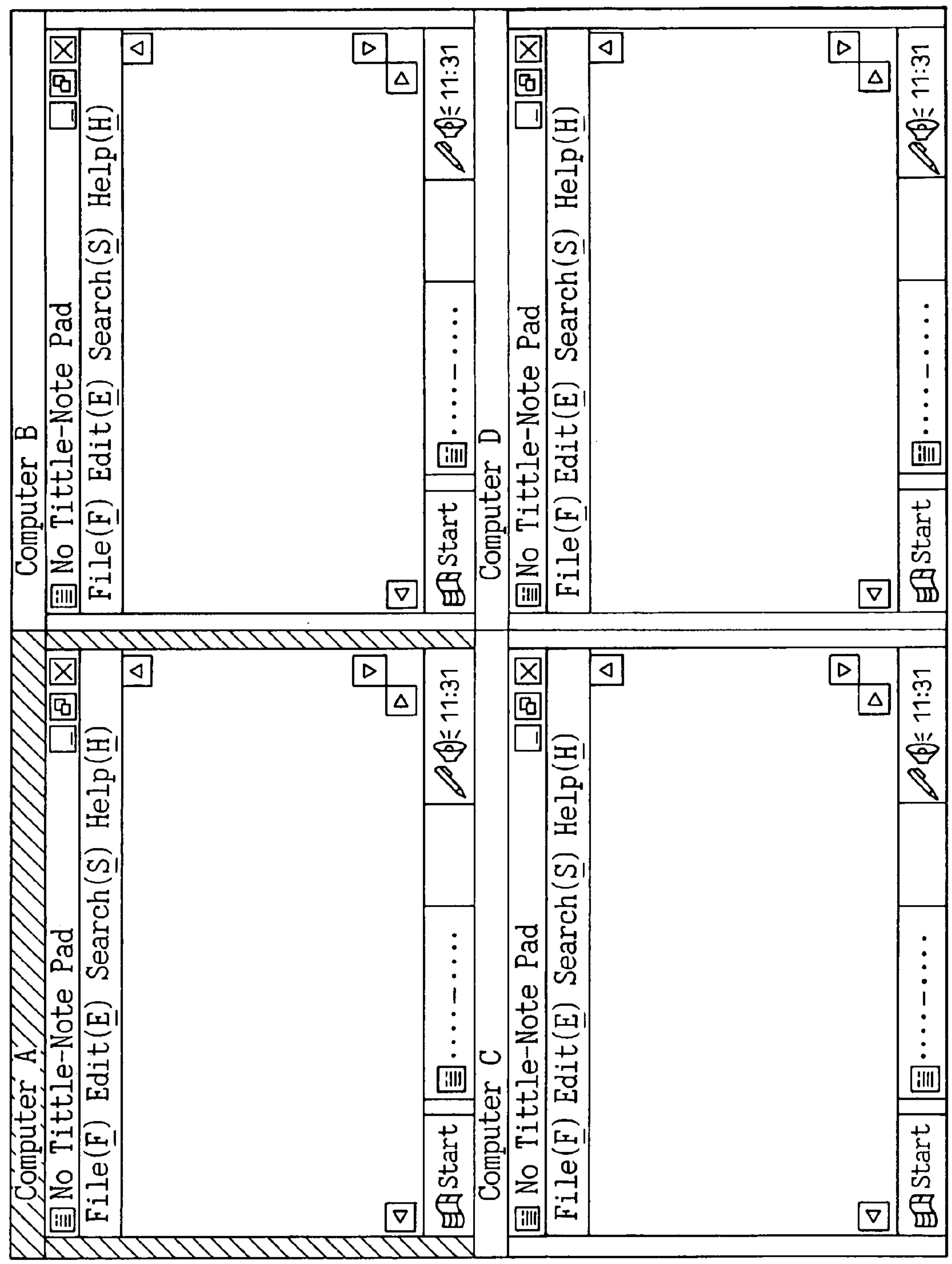
FIG. 7 is a diagram illustrating another alternative indication on the screen of the display device after the connecting-channel identification operation is performed.

FIG. 7 is a diagram illustrating another alternative indication on the screen of the display device after the connecting-channel identification operation is performed.

In the case of this example, an image representing data to be indicated on the screen of the display device corresponding to each of the plurality of computers is scaled down. Then, such data are simultaneously and collectively indicated (that is, what is called a tiled display image of such data is indicated) on the screen of the display device corresponding to the computer that is currently actively connected with the input device. FIG. 7 illustrates a state in which the application software "note pad" is executed in all the four computers. In the case of this example, a user can easily and visually know the connecting state and the operating state of each of the computers. In the case that there is a computer connecting channel not connected to a computer, a tiled display area for indicating the computer connecting channel is explicitly displayed by being dimmed (or grayed), in comparison with other areas, as in the case of using the pop-up/pull-down menu format.

In the case of employing the tiled display format, the connecting state of each of the computers cannot be always indicated on the screen of the display device, differently from the case of using the pop-up/pull-down menu format or the button bar format. Thus, only when a user performs a computer switching operation, can the connecting state be indicated thereon. That is, for example, when a user performs a predetermined key operation by using the keyboard, or when the user clicks a mouse button on a predetermined icon, the connecting state is indicated or deleted.

Thus, in the case of this example, the connecting state of each of the computers is indicated on the screen of the display device. Consequently, a user using the computer can, by simultaneously watching the screen of the display device, verify the connecting state of each of the computers. Thus, the working efficiency of the computer is improved. Further, even in the case that the computer switch is installed at some distance from a workbench, on which the computers and the input device are placed, so as to improve work environment or owing to restrictions in the work environment, namely, in the case that the computer switch is installed at a difficult-to-find place for a user, for example, under the workbench or behind the computers, the user can easily check the connecting state of each of the computers according to the indication on the screen of the display device.

In the case of this embodiment, a user refers to the indication of the connected state of each of the computers on the screen of the display device corresponding to the computer that is currently actively connected with the input device. Then, the user performs a selection operation by manipulating cursor keys of the keyboard or a mouse. Thus, when the cursor is on an image area corresponding to a desired one of the computer to be connected, the user depresses a return key or clicks a mouse button to thereby switch the currently used computer to the desired one of the computers. This computer switching function is described hereunder.

A computer switching operation of this embodiment comprises a command receiving step of selecting from a plurality of computers a desired computer other than a computer, which is currently actively connected with the input device, and receiving a switching command, which activates the connection between the desired computer and the input device, from the computer, which is currently actively connected with the input device, and a switching step of activating the connection between the input device and the computer corresponding to the switching command after the switching command is received. Processing unit to be used at each of these steps are the control software programs, which are used in combination with the computer switch of the present invention and installed on each of the computers, and the PC microcomputers and the KB microcomputer that are provided in the computer switch 1 and will be described later by referring to the drawings.

Figure 8:
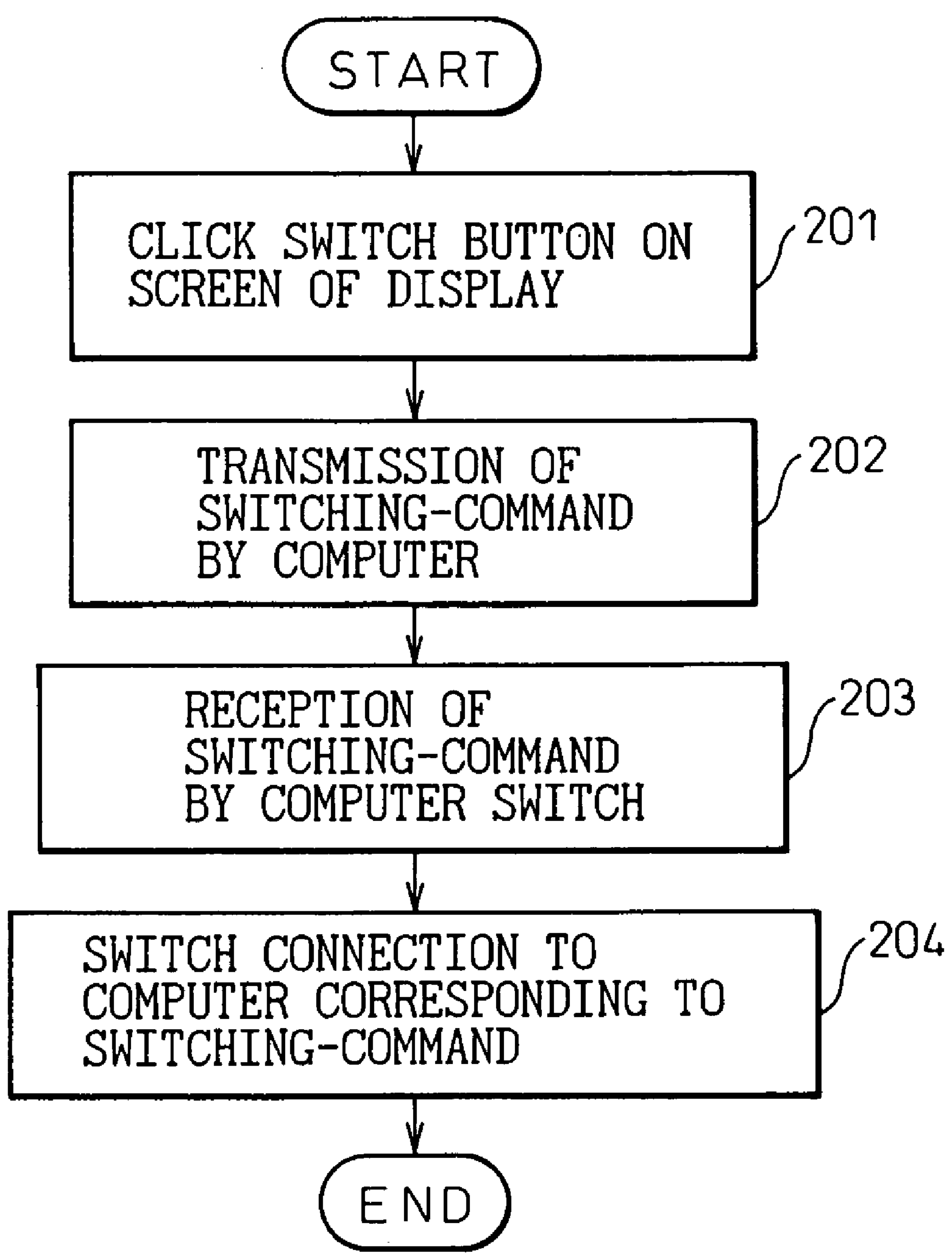
FIG. 8 is a flowchart illustrating a computer switching operation of the first embodiment of the present invention.

FIG. 8 is a flowchart illustrating the computer switching operation of the first embodiment of the present invention.

Hereinafter, a sequence of steps of performing the computer switching function, in a case in which a user currently using the computer A switches this computer to the computer B designated by "COMPUTER B" by referring to the pop-up/pull-down menu shown in FIG. 5, will be described with reference to the flowchart of FIG. 8 by way of example.

First, at step 201, the user clicks a mouse button on the "COMPUTER B" of the pop-up/pull-down menu of FIG. 5 so as to switch the computer, which is to be used, from the computer A to the computer B. At that time, the connection between the computer A and the input device, such as a keyboard or a mouse, is in an active state. A key code outputted from the input device is sent to the computer A.

When the mouse button is clicked on the "COMPUTER B" of the pop-up/pull-down menu at step 201, the computer A sends a switching command to the computer switch 1 at step 202. Processing is performed at step 202 according to a control software program installed in the currently available computer, that is, the computer A in this embodiment. The switching command is used to activate the connection between the input device and the computer selected by the user, which is other than the currently available computer. The switching command consists of a specific code, which instructs the switching of the computer, and a computer identifier (ID) corresponding to each of the computers. In this embodiment, the switching command is used to instruct the switching of the currently used computer to the computer B. Thus, a computer identifier indicating the computer B is sent to the computer switch 1 together with the code instructing the switching of the computer.

Subsequently, the computer switch 1 receives the switching command at step 203.

Then, at step 204, the computer switch 1 activates the connection thereof with the computer corresponding to the computer identifier. In this embodiment, the connection between the computer B and the computer switch 1 is activated. Processing at step 204 is performed by the PC microcomputers and the KB microcomputer that are provided in the computer switch 1 and that have been described with reference to FIG. 1.

When the connection between the computer B and the computer switch 1 is activated, so that the computer B becomes available, a check mark is displayed in the menu item "COMPUTER B" of the pop-up/pull-down menu on the screen of the display device corresponding to the computer B.

Next, the computer switching operation to be performed by using the tiled display format illustrated in FIG. 7 is described hereinbelow.

As described with reference to FIG. 7, the indication of the tiled display format cannot be displayed at all times on the screen of the display device, differently from those of the pop-up/pull-down menu format and of the button bar format. Thus, a tiled display image is indicated only when the user performs the computer switching operation. That is, for instance, when the predetermined key operation is performed by using the keyboard, or when the predetermined icon is clicked by using a mouse, the tiled display image is indicated or deleted.

After the tiled display image is indicated on the screen of the display device, the user performs an operation of selecting a computer, to which the currently used computer is switched, by checking the connecting state of each of the computers according to this tiled display image. In this embodiment, an area corresponding to a computer, which is a selection candidate, on the screen is displayed by being inverted. For instance, as illustrated in FIG. 7, the area "COMPUTER A", which indicates that the selection candidate is the computer A, is displayed by being reversed.

As described above, in the case of the first embodiment of the present invention, the user performs the selection process by operating the cursor keys of the keyboard or the mouse. Subsequently, when a cursor is placed on the area corresponding to the desired computer on the screen, the user definitely determines the computer, to which the currently used computer is switched, by depressing the return key or clicking the mouse button. Incidentally, as described above, in the case that there is a computer connecting channel not connected to a computer, an indication portion corresponding to this connecting channel on the pop-up/pull-down menu is explicitly displayed by being dimmed (or grayed). However, the computer is adapted so that the depression of the return key and the clicking of the mouse button cannot be performed when the cursor is placed on the grayed portion. The presence/absence of the connecting channel not connected to a computer can be determined at the time of performing the connecting channel inspection function (to be described later).

According to this embodiment of the present invention, users can easily perform the computer switching operation by using the currently available computer and simultaneously observing the screen of the display device.

Next, the connecting channel inspection function of the first embodiment of the present invention is described hereinbelow.

As described with reference to FIGS. 5 to 7, the connecting channel inspection function is performed by inspecting the connecting state of each of the computer connecting channels 11*a*, 11*b*, 11*c*, and 11*d* of the computer switch 1 so as to indicate the connecting state of each of the computers, which are respectively connected to the computer connecting channels 11*a*, 11*b*, 11*c*, and 11*d* of the computer switch 1, on the screen of the display device corresponding to the currently used computer. The connecting channel inspection function is automatically performed at predetermined time intervals.

Figure 9:
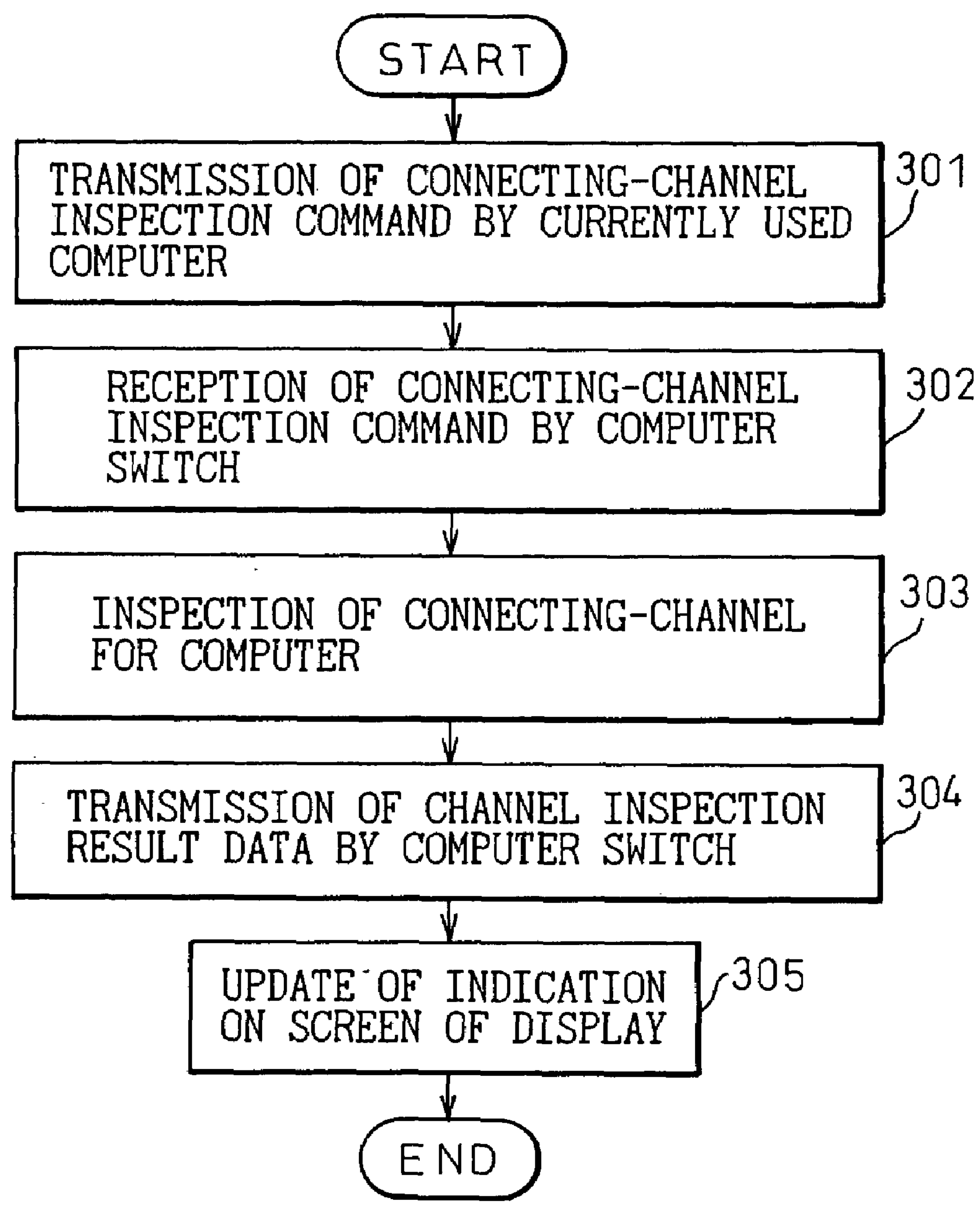
FIG. 9 is a flowchart illustrating a connecting-channel inspection operation of the first embodiment of the present invention.

FIG. 9 is a flowchart illustrating a connecting-channel inspection operation of the first embodiment of the present invention.

First, at step 301, the currently used computer sends a connecting-channel inspection command, which is used to check the connecting state in each of the computer connecting channels, to the computer switch. The connecting-channel inspection command is 2-byte data consists of a code, which instructs to check the connection with the computer connecting channels, and another code indicating the computer connecting channel to be checked.

The computer switch receives the connecting-channel inspection command at step 302. Then, the computer switch checks the connecting state of the computer connecting channel designated by the received connecting-channel inspection command.

Subsequently, at step 304, the computer switch sends channel inspection result data, which indicates a result of the inspection, to the currently used computer.

Then, at step 305, the currently used computer updates the indication of the connecting state of the computer on the screen of the display device corresponding to the currently used computer in the computer switch 1 according to the channel inspection data. As described above, in the case of using the indication of the pop-up/pull-down menu format or of the button bar format as illustrated in FIG. 5 or 6, the updated indication is displayed on the screen without being changed. In contrast, the indication area of the computer connecting channel not connected to a computer is displayed by being dimmed (or grayed) in comparison with those of other connecting channels.

Incidentally, in the case of employing the tiled display format as illustrated in FIG. 7, such an indication is not necessarily displayed on the screen of the display device upon completion of the connecting channel inspection function. In this case, such an indication is displayed until a user displays the indication of the tiled display format on the screen of the display device.

The aforementioned operation, consisting of steps 301 to 305 is performed on each of the computer connecting channels other than the computer connecting channel connected to the currently used computer. That is, in the case that there are four computer connecting channels, the operation consisting of steps 301 to 305 is performed three times when the connecting channel inspection function is performed one time.

The connecting state of the computer connected to each of the computer connecting channels in the computer switch can be indicated on the screen of the display device corresponding to the currently used computer by performing the connecting channel inspection function at the predetermined time intervals.

Next, the data transfer function of a second embodiment of the present invention will be described hereinbelow.

The data transfer function of this embodiment enables the transmission/reception of data among a plurality of computers connected to the input device.

The data transfer function of this embodiment is added to the functions of the first embodiment and may be singly applied to the computer switch.

Figure 10:
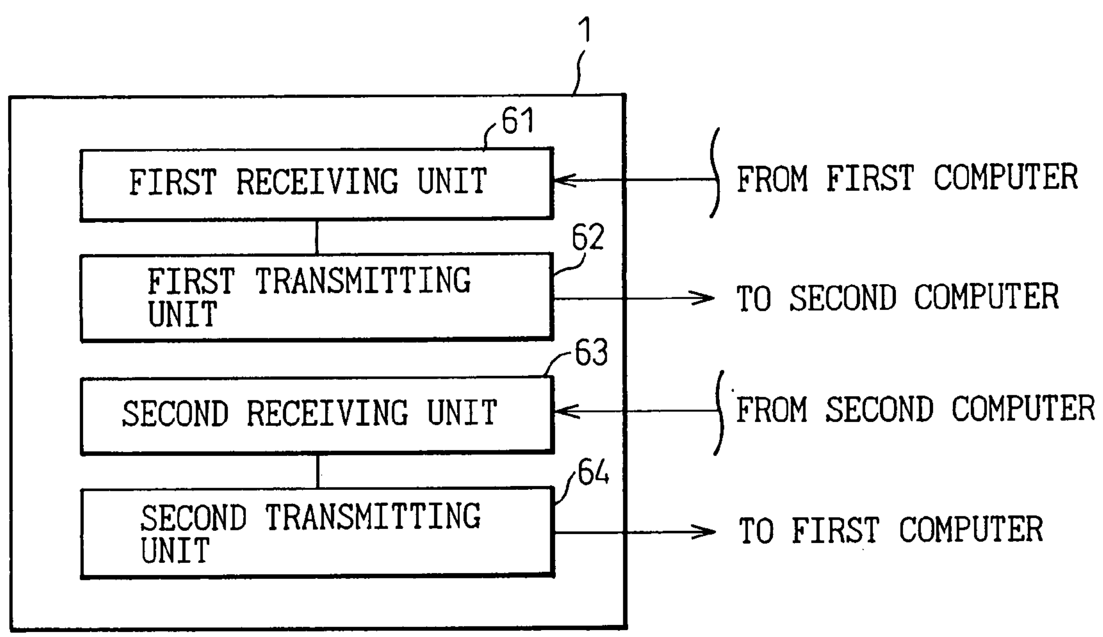
FIG. 10 is a schematic block diagram illustrating a computer switch that is a second embodiment of the present invention.

FIG. 10 is a schematic block diagram illustrating a computer switch that is the second embodiment of the present invention.

According to this embodiment, the computer switch 1, for connecting an input device to a plurality of computers, which comprises first receiving unit 61 for receiving a data acquisition command, which is transmitted from a first computer of the plurality of computers so that the first computer acquires data retained by a second computer, which is other than the first computer, and a computer identifier corresponding to the second computer from the first computer, first transmitting unit 62 for transmitting the data acquisition command to the second computer after the computer identifier and the data acquisition command are received, second receiving unit 63 for receiving from the second computer the data retained by the second computer after the second computer receives the data acquisition command, and second transmitting unit 64 for transmitting the data retained by the second computer to the first computer after the data is received.

The processing unit are realized by the control software programs, which are used in combination with the computer switch of the present invention and installed on each of the computers, and the PC microcomputers and the KB microcomputer that are provided in the computer switch 1 and will be described later by referring to the drawings. Incidentally, the operations to be performed in each of the computers may be performed by firmware instead of the control software programs.

The data transfer operation of the second embodiment of the present invention comprises a first receiving step of receiving a data acquisition command, which is transmitted from the first computer of the plurality of computers so that the first computer acquires data retained by the second computer, which is other than the first computer, and a computer identifier corresponding to the second computer from the first computer, a first transmitting step of transmitting the data acquisition command to the second computer after the computer identifier and the data acquisition command are received, a second receiving step of receiving from the second computer the data retained by the second computer after the second computer receives the data acquisition command, and a second transmitting step of transmitting the data retained by the second computer to the first computer after the data is received. Processing unit to be used at each of these steps are the control software programs, which are used in combination with the computer switch of the present invention and installed on each of the computers, and the PC microcomputers and the KB microcomputer that are provided in the computer switch 1 and will be described later by referring to the drawings.

Figure 11:
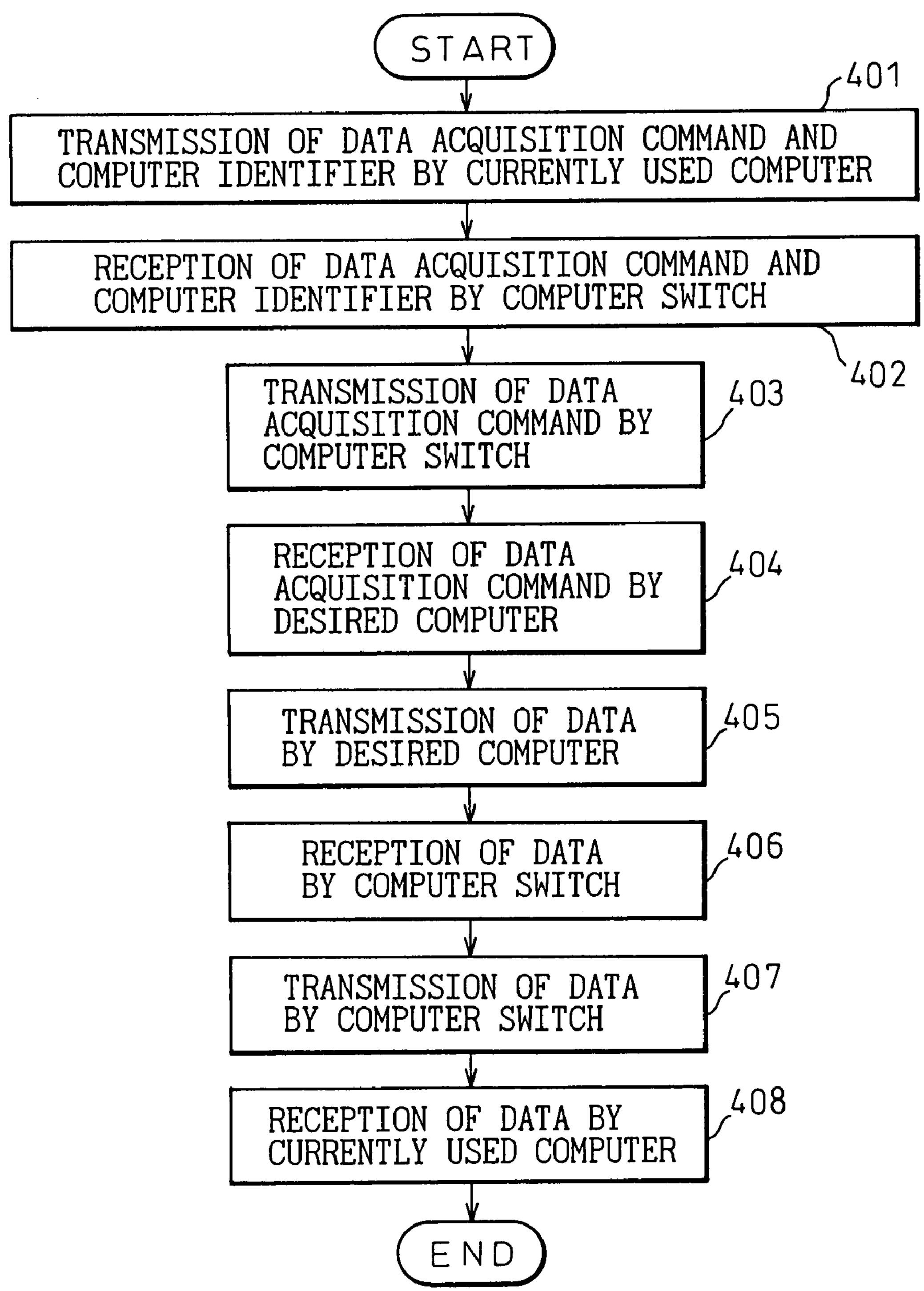
FIG. 11 is a flowchart illustrating a data transfer operation of the second embodiment of the present invention.

FIG. 11 is a flowchart illustrating the data transfer operation of the second embodiment of the present invention.

First, at step 401, the currently used computer sends a 2-byte command, which includes a data acquisition command instructing to acquire desired data among data held by the desired computer and also includes a computer identifier corresponding to the desired computer, to the computer switch.

The computer switch receives the data acquisition command and the computer identifier at step 402. Then, at step 403, the computer switch transmits the data acquisition command to the computer corresponding to the computer identifier received at step 403, that is, to the desired computer.

The desired computer receives the data acquisition command at step 404. Then, at step 405, the desired computer transmits the data held therein to the computer switch.

The computer switch receives data at step 406. Then, at step 407, the computer switch transmits data to the currently used computer.

Further, the computer currently used by the user receives data at step 408.

In the case of using the conventional computer switch, the transmission/reception of various data can be performed only among the input device, the computer, which is actively connected with the input device, and the display device corresponding to this computer. Conversely, the transmission/reception of such data cannot be performed between the input device and the other adjacent computers. However, according to this embodiment, transmission/reception among the plurality of computers connected to the computer switch can be performed.

Next, practical examples of the application of the second embodiment of the present invention are described hereinbelow.

In the case of a first example of the application thereof, the indication of the connecting state of the computer connected to the computer switch 1, as described with reference to FIGS. 5 and 6, is performed by indicating the name of an application program currently activated in each of the computers, instead of indicating merely a name for identifying each of the computers.

Figure 12:
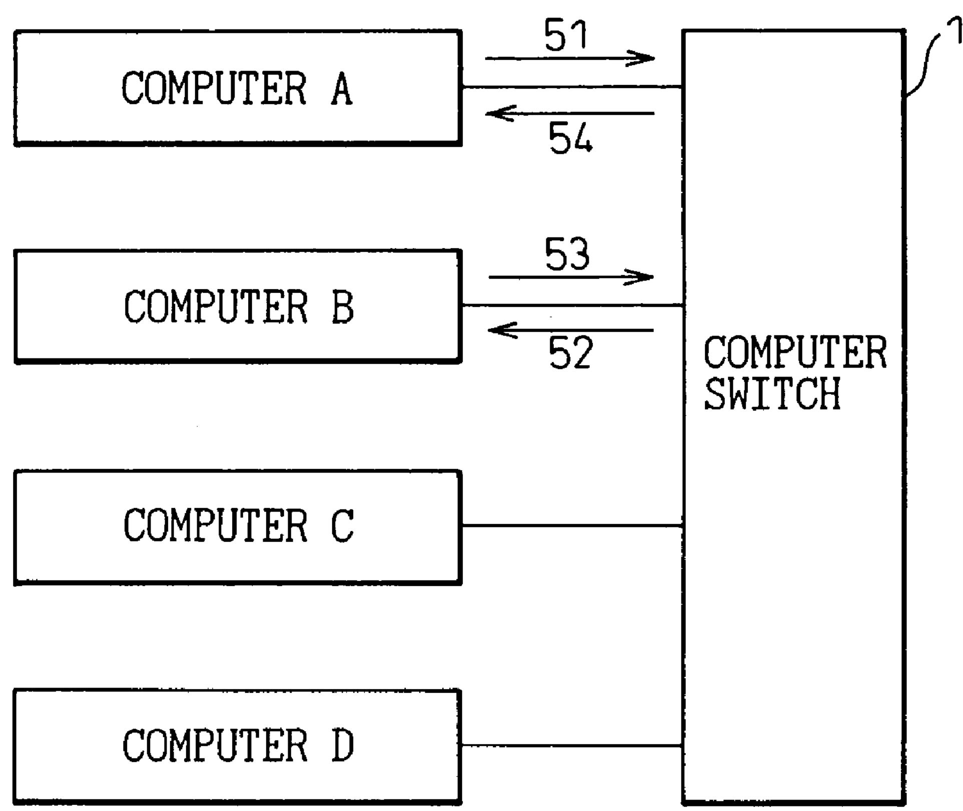
FIG. 12 is a diagram illustrating a flow of data among computers in the data transfer operation of the second embodiment of the present invention.

FIG. 12 is a diagram illustrating a flow of data among the computers in the data transfer operation of the second embodiment of the present invention. In this figure, the drawing of the input device is omitted.

First, the computer A transmits a data acquisition command and a computer identifier, which indicates the computer B, to the computer switch 1 (as indicated by an arrow 51).

Subsequently, the computer switch 1 receives the data acquisition command and the computer identifier and transmits the data acquisition command to the computer indicated by the received computer identifier, that is, the computer B (as indicated by an arrow 52).

The computer B receives the data acquisition command and then transmits the data retained by the computer B to the computer switch 1 (as indicated by an arrow 53).

The computer switch 1 receives the data and then transmits the data to the computer A (as indicated by an arrow 54).

The transmission/reception of information concerning the state of utilization of each of the computers is achieved by performing the data transfer function illustrated in FIG. 11. Thus, the indication of the connecting state of the computer connected to the computer switch 1, as described with reference to FIGS. 5 and 6, is achieved by indicating the name of an application program currently activated in each of the computers, instead of indicating merely a name for identifying each of the computers. For example, the indications or icons suggesting “word processing software”, “mail communication software”, “image processing software”, and “internet browser” are displayed in the pop-up/pull-down menu format or in the button bar format of FIG. 5 or 6 correspondingly to the computers A, B, C, and D, respectively.

The latest state is indicated on the screen of the display device corresponding to the computer at all times by automatically performing the data transfer function illustrated in FIG. 11 at the predetermined time intervals in each of the computers.

In the case of a second example, the second embodiment is applied to the case of knowing what application is activated in each of the plurality of computers connected to the input device, such as the keyboard, through the computer switch.

For instance, in the case that a user wishes to know what application program is activated on the computer B, which is not actively connected with the input device, when a user currently utilizes word processing software on the computer A, which is actively connected with the input device through the computer switch 1, it is sufficient to set data, which indicates the activated state of application programs in each of the computers, as the "data" described in the flowchart of FIG. 11. An operation of knowing the state of each of the computers other than the currently used computer may be performed at any time. Thus, when a user wishes to know the state of application software in each of the computers other than the currently used computer at a desired time, the process may be performed from step 401. Further, it is sufficient to perform the indication of the state of each of the computers on the screen of the display device corresponding to the currently used computer according to data obtained at step 408.

In the case of a third example, the second embodiment is applied to the case that word processing software is activated in the computer B through the computer switch 1, for instance, when word processing software is used in the computer A.

In this case, it is sufficient to substitute an application program activating command, which instructs to perform the "activation of word processing software", for the "data acquisition command". Because the computer B receives the application program activating command at step 404, word processing software is activated in the computer 404. Incidentally, in the case of this example, there is no need to perform the process to be performed at and after step 406 illustrated in FIG. 11.

Further, after the word processing software is activated in the computer B, document data stored in a hard disk connected to the computer B is loaded to the computer B in which the word processing software is activated.

In this case, it is sufficient to substitute a document data loading command, which loads document data, for the "data" in the flowchart in FIG. 11, and to let this document data loading command contain the file name of the document data. Because the computer B receives the document data loading command at step 404, desired document data is loaded to the computer B in which the word processing software is activated. In this case, there is no necessity for performing the process to be performed at and after step 405 illustrated in FIG. 11.

Incidentally, although the word processing software is activated in the case of this example of application by way of example, the second embodiment may be applied to the case of activating other kinds of application software, such as internet browser software and spreadsheet software.

In the case of a fourth example, the use environment of each of the computers connected to the computer switch is set by the currently used computer. For example, in the case of customizing the use environment of the computer B by using the currently used computer A, it is sufficient to substitute a command, which sets the environment, for the "data acquisition command" in the flowchart of FIG. 11. Also, it is sufficient that the environment setting command is the same key code, which instructs the setting of an ordinary environment, as outputted when the computer is used alone. Because of the fact that the environment setting command is transmitted together with a computer identifier corresponding to the computer, the setting of the environment of which is to be customized, namely, corresponding to the computer B, and that the computer B receives the application program activating command at step 404, the setting of the environment of the computer B is achieved. Incidentally, in the case of this example, there is no need to perform the process at and after step 405.

Hitherto, the customization of the environment of shortcut keys usually used a user has been performed after the currently used computer is switched to a desired computer by using the conventional computer switch. However, according to this example, an environment of each of the computers connected to the computer switch can easily be customized by the currently used computer.

The aforementioned computer switches of the present invention can be cascaded.

Figure 13:
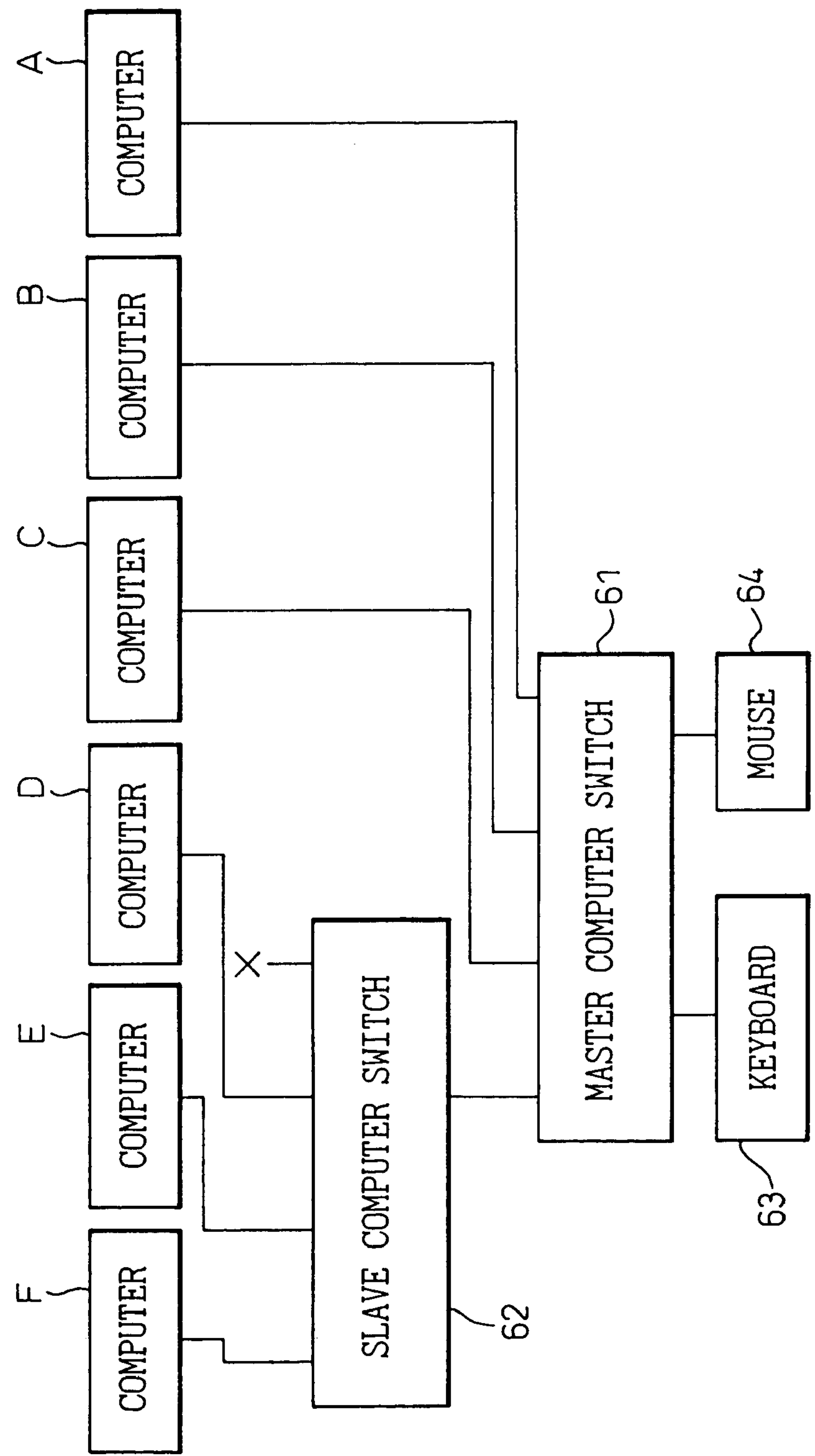
FIG. 13 is a diagram illustrating a cascade connection of computer switches.

FIG. 13 is a diagram illustrating a cascade connection of computer switches.

As illustrated in FIG. 13, a slave computer switch 62 is cascaded to a master computer switch 61. Thus, six computers A, B, C, D, E, and F are connected to the computer connecting channels. Further, a keyboard 63 and a mouse 64 are connected to the input-device connecting channel of the master computer switch 61.

Figure 14:
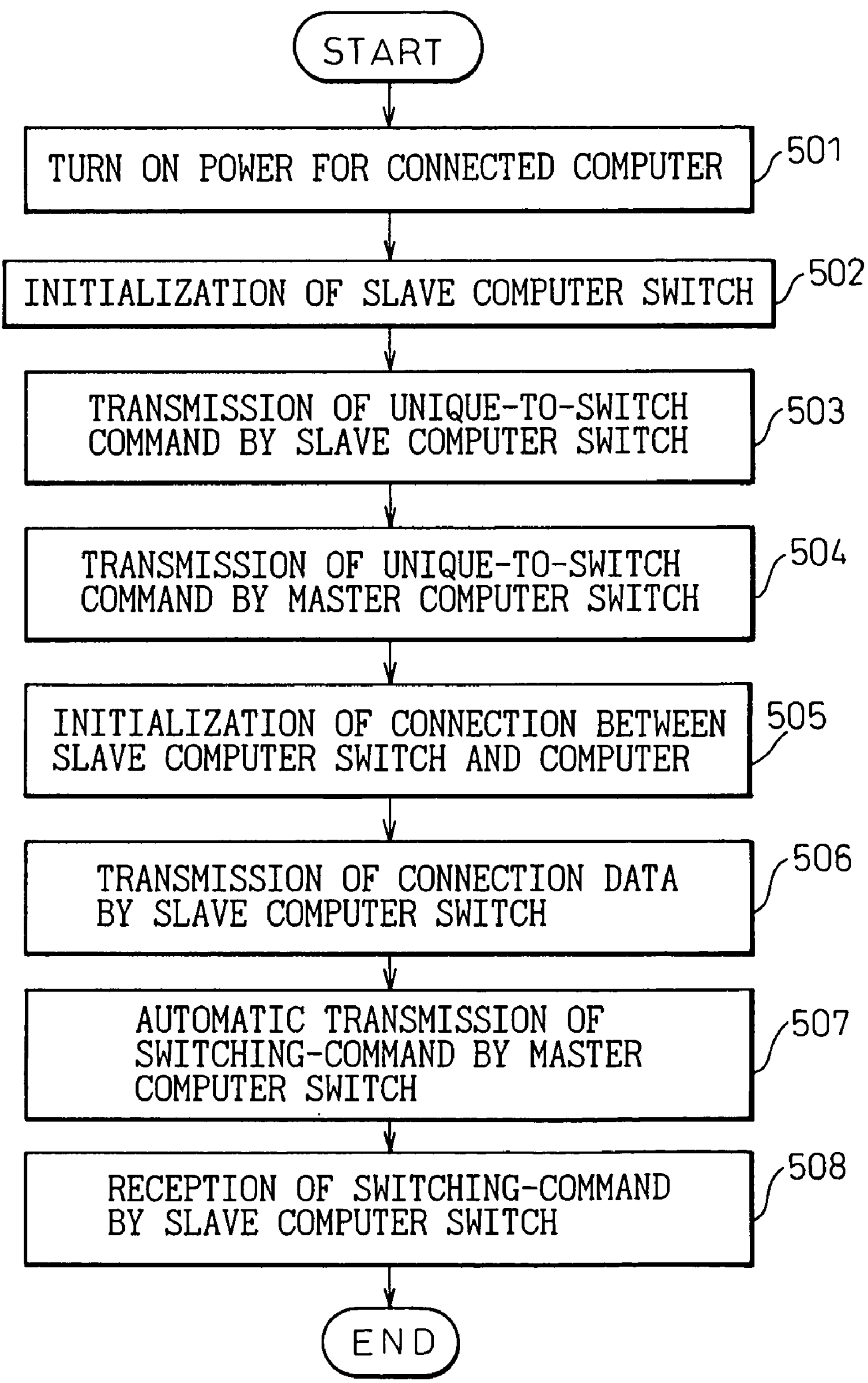
FIG. 14 is a flowchart illustrating a cascade recognition operation in the case of cascaded computer switches.

FIG. 14 is a flowchart illustrating a cascade recognition operation in the case of cascaded computer switches.

As described above, electric power for the computer switches of the present invention is supplied from the computers connected thereto.

When a computer is connected to one of the computer connecting channels of the slave computer switch 62 and power is supplied from the computer thereto at step 501, the supply of electric power to the corresponding microcomputer of the slave computer switch 62 is started.

Subsequently, at step 502, the initialization of the slave computer switch 62 is performed. This initialization is, for instance, to set the computer connecting ports of the slave computer switch 62.

Then, at step 503, the slave computer switch 62 transmits a unique-to-switch command, which indicates that this switch is a computer switch, to the master computer switch 61. This unique-to-switch command is inevitably outputted after power is supplied to the computer switch from the computer connected thereto and the initialization of the computer switch is performed. Moreover, the unique-to-switch command is outputted without exception when the connecting channel identification function described above with reference to FIG. 4 is performed on the computer.

Even in the case that each of the computer switches, which are not cascaded, is used singly, the unique-to-switch command is outputted. In this case, the input device, such as the keyboard, receives this command. However, the input device performs only the returning of a NACK signal when receiving the unique-to-switch command. Thus, the processing to be performed at the following step 504 is not performed.

At step 504, the master computer switch 61 receives the unique-to-switch command. According to this unique-to-switch command, the master computer switch 61 recognizes that the switch 61 is cascaded and placed at a master side.

Subsequently, at step 505, the BIOS performs an operation of recognizing the connection between the slave computer switch 62 and the computer connected thereto. As a result of this operation, the slave computer switch 62 recognizes, from the data communication between this switch and the computer, whether or not a computer is connected thereto.

Then, at step 506, the slave computer switch 62 transmits connection data, which is obtained at step 504 and indicates the connecting state of the computer, to the master computer switch 61. This connection data is 2-byte data that includes a command, which indicates that this data is connection data, and a connecting channel identifier correspond to a computer connecting channel. The connection data relates to and is transmitted corresponding to each of the computer connecting channels respectively connected to the computers. Connection data relating to the computer connecting channel, to which no computers are connected, is not transmitted.

Subsequently, at step 507, a switching command is automatically transmitted from the master computer switch 61 to this computer, that is, the computer that is connected to the slave computer switch 62 this time and that is supplied with electric power. As described above, a key code indicating a switching command is sent from the keyboard to the computer by performing a predetermined key operation (for instance, simultaneously pressing Ctrl, Alt and Shift keys) on the keyboard. In response to this, the switching command is transmitted from the computer to the computer switch. However, the same key code as transmitted by the predetermined key operation is automatically transmitted from the master computer switch 61 to the slave computer switch 62 at step 507, at which a part of the initialization of the cascade connection is performed.

Then, at step 508, the slave computer switch 62 receives the switching command, and activates the connection between the computer and the input device through the slave computer switch 62 and the master computer switch 61.

The aforementioned process at steps 501 to 508 is performed every time the computer is connected to the slave computer switch in the case of using the cascaded computer switches. Upon completion of this process, the operations of the first and second embodiments, which have been described, may be performed.

FIG. 15 is a flowchart illustrating the computer switching operation in the case of using the cascaded computer switches.

Hereinafter, a sequence of steps for performing the computer switching function will be described with reference to FIG. 15 in relation to the case where a user currently using the computer D connected to the slave computer switch 62 switches this computer to the computer F similarly connected to the slave computer switch 62 when the cascade connection of the computer switches, as illustrated in FIG. 13, is used.

First, at step 601, the user clicks the switch button on the screen so as to switch the computer, which is to be used, from the computer D to the computer F. In the case of an example of operating this switch button, the user clicks the mouse button on the indication "computer F" on the pop-up/pull-down menu as illustrated in FIG. 5. At that time, the connection between the computer D and the input device, such as the keyboard or the mouse, has been activated through the master computer switch 61 and the slave computer switch 62. The key code outputted from the input device is sent to the computer D.

Subsequently, the computer D transmits a switching command to the slave computer switch 62 at step 602. Processing at this step 602 is performed according to the control software program installed on the currently available computer, that is, the computer D. The switching command is used to activate the connection between the computer, which is other than the currently available computer and selected by the user, and the input device. As described above, the switching command is a 2-byte command consists of a specific code, which instructs the switching of the currently used computer, and a computer identifier (ID) added correspondingly to each of the computers. In this case, the switching command is issued so as to instruct to switch the currently used computer to the computer F. Thus, the computer identifier indicating the computer F is transmitted together with the code, which instructs to perform the switching, to the slave computer switch 62.

Then, at step 603, the slave computer switch 62 receives the switching command.

Subsequently, at step 604, the slave computer switch 62 transmits the switching command to the master computer switch 61.

Subsequently, at step 605, the master computer switch 61 receives the switching command. At that time, the master computer switch 61 determines the computer, to which the switching command is to be sent, according to the computer identifier contained in the switching command. In the case that the computer identifier indicates the computer connected to the master computer switch 61, an operation of switching to this computer from the currently used computer is performed. In contrast, in the case that the computer identifier indicates the computer connected to the slave computer switch 62, the switching command is transmitted to the slave computer switch 62.

In the case of this example, the computer to which the switching command is transmitted is the computer F connected to the slave computer switch 62. Thus, as illustrated at the next step 606, the master computer switch 61 transmits the switching command to the slave computer switch 62.

Subsequently, at step 607, the slave computer switch 62 receives the switching command.

Then, at step 608, the slave computer switch 62 activates the connection between the computer F, which corresponds to the computer identifier, and the slave computer switch 62. Processing at this step 608 is performed by the microcomputer of the slave computer switch 62. Incidentally, when the user uses the computer D, the connection between the slave computer switch 62 and the master computer switch 61 has already been activated. Upon completion of the processing at this step 608, the connection between the computer F and the input device becomes active, so that the computer F becomes available. When the connection between the computer F and the input device becomes active and the computer F becomes available, a check mark is displayed in an menu item "COMPTUER F" of the pop-up/pull-down menu on the screen of the display device corresponding to the computer F.

Thus, the computer switches of the present invention can be used by being cascaded to perform the computer switching operation. Moreover, as can easily be understood from the foregoing description, the connecting channel identification function, the connecting channel inspection function, and the data transfer function are achieved.

Furthermore, each of the connecting channel identification function, the connecting channel inspection function, and the data transfer function is performed by executing control software programs, which are used in combination with the computer switch of the present invention and installed on each of the computers, in each of the PC microcomputers 13*a*, 13*b*, 13*c*, and 13*d* and the KB microcomputer 14 provided in the computer switch. Next, an operation of each of the PC microcomputers 13*a*, 13*b*, 13*c*, and 13*d* and the KB microcomputer 14 provided in the computer switch is described hereinbelow.

Figure 16:
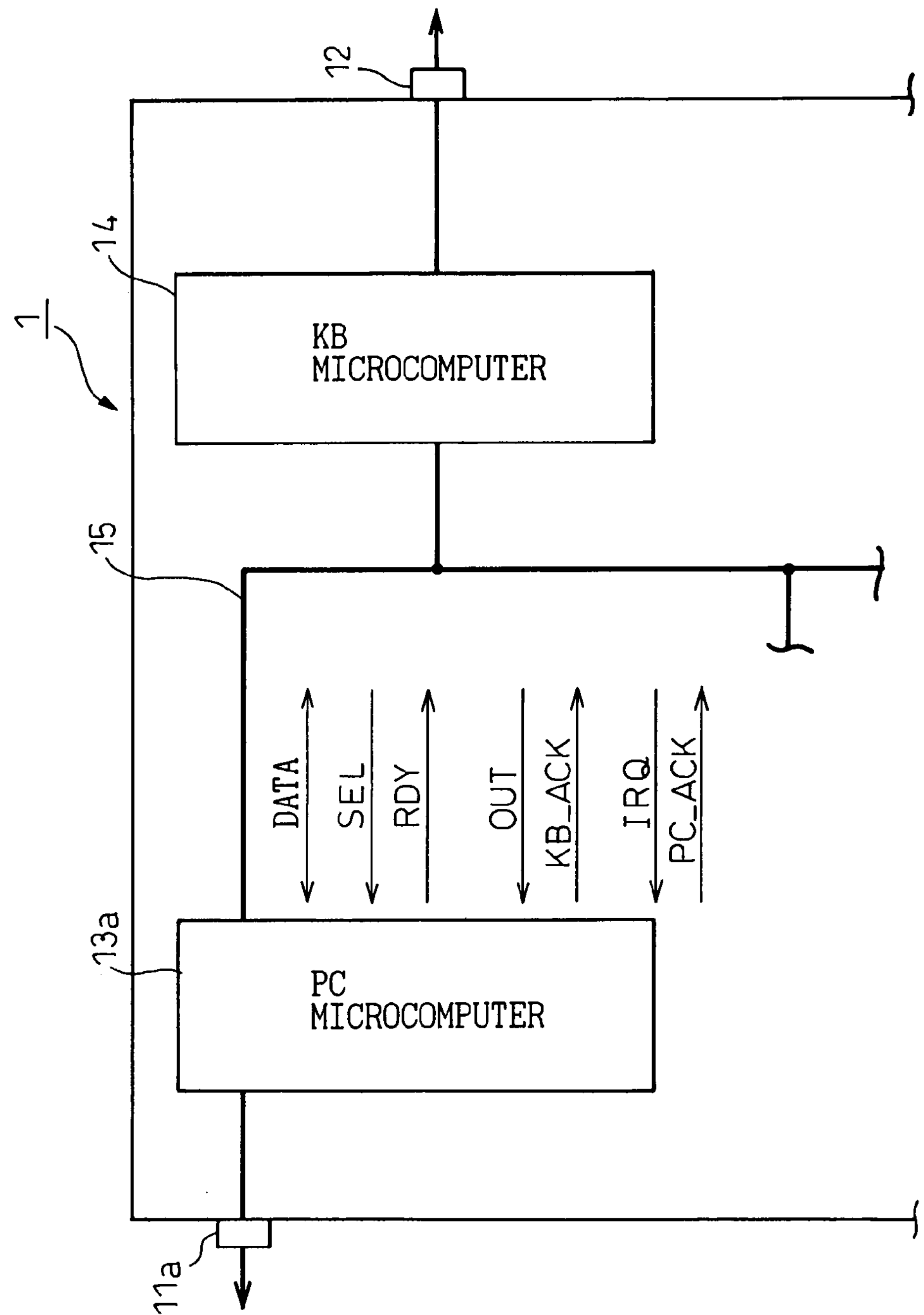
FIG. 16 is a diagram illustrating operations of PC microcomputers (to be described later) and a KB microcomputer (to be described later) in a computer switch.

FIG. 16 is a diagram illustrating an operation of each of the PC microcomputers and the KB microcomputer in the computer switch.

FIG. 16 illustrates data flow between the PC microcomputer 13*a* and the KB microcomputer 14 in the computer switch 1. The word "data" used herein designates commands or data to be used in each of the operations. The "data" is exchanged among the PC microcomputers and the KB microcomputer in the computer switch 1.

According to the computer switching function described with reference to FIG. 8, at step 204, the computer switch 1 activates the connection between the computer, which corresponds to the computer identifier, and the computer switch 1. This processing is achieved by each of the microcomputers in the computer switch as follows. First, the KB microcomputer 14 recognizes the connecting channel (in FIG. 16, the computer connecting channel 11*a*) to be connected thereto according to the computer identifier. Further, the microcomputer 14 activates an SEL signal corresponding to the corresponding PC microcomputer (in FIG. 16, the PC microcomputer 13*a*) among the PC microcomputers 13*a*, 13*b*, 13*c*, and 13*d*. Thus, the connection between this computer and the computer switch 1 is activated. Consequently, among the PC microcomputers 13*a*, 13*b*, 13*c*, and 13*d* connected to a data bus 15, only the PC microcomputer 13*a*, which is in active connection with the computer switch, can receive data.

Regarding the connecting channel identification function and the connecting channel inspection function respectively described with reference to FIGS. 4 and 9, the microcomputer 14 checks whether or not a RDY signal is active. Consequently, it is known whether or not the power supply for the computer connected to the computer switch 1 is turned on. If the a RDY signal is inactive, the KB microcomputer 14 does not activate the SEL signal. Thus, no exchange of data is performed.

Further, in an operation of performing the data transfer function described with reference to FIG. 11, the transmission/reception of data between the PC microcomputer 13*a* and the KB microcomputer 14 in the computer switch 1 is described hereunder according to the direction of data flow.

In the case that data is transmitted from the KB microcomputer 14 to the PC microcomputer 13*a*, first, the KB microcomputer 14 activates an OUT signal to thereby indicate commencement of data transmission to the PC microcomputer 13*a*. Then, the KB microcomputer 14 transmits data to the PC microcomputer 13*a*. Upon completion of data reception by the PC microcomputer 13*a*, this microcomputer activates a KB_ACK signal to thereby indicate the termination of the data reception to the KB microcomputer 14. In response to this, the KB microcomputer 14 disables the OUT signal. Then, the PC microcomputer 13*a* disables the KB_ACK signal. Thus, a sequence of data exchanges is completed.

In the case that data is transmitted from the PC microcomputer 13*a* to the KB microcomputer 14, first, the PC microcomputer 13*a* activates IRQ signal to thereby indicate commencement of data transmission to the KB microcomputer 14. Then, the PC microcomputer 13*a* transmits data to the KB microcomputer 14. Upon completion of data reception by the KB microcomputer 14, the KB microcomputer 14 activates the KB_ACK signal to thereby indicate the termination of the data reception to the PC microcomputer 13*a*. In response to this, the PC microcomputer 13*a* disables the IRQ signal. Then, the KB microcomputer 14 disables the KB_ACK signal. Thus, a sequence of data exchanges is completed.

As described above, the operations of performing the computer switching function, the connecting channel identification function, the connecting channel inspection function, and the data transfer function in the computer switch 1 are achieved by performing data exchange among the PC microcomputers 13*a*, 13*b*, 13*c*, and 13*d*, and the KB microcomputer 14.

Further, as described above, according to the computer switch of the present invention, the connecting state of the computer is displayed on the screen of the display device. Thus, a user using the computer by watching the screen of the display device can verify the connecting state of the computer without taking his eyes off the screen. Consequently, the working efficiency of the computer is enhanced. Further, even in the case that the computer switch is installed at some distance from a workbench on which the computers and the input device are placed, namely, in the case that the computer switch is installed at a difficult-to-find place for a user, for example, under the workbench or behind the computers, the user can easily check the connecting state of each of the computers according to the indication on the screen of the display device, and can perform a computer switching operation.

Furthermore, according to the computer switch of the present invention, the transmission/reception of data among a plurality of computers is achieved. Moreover, the transmission/reception of data among a plurality of computers connected through the computer switch is attained. Thus, the activation of application programs in the computers other than the currently used computer and the customization of the use environment thereof can be performed by a user from the currently used computer.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A computer switch for connecting an input device to a plurality of computers, comprising:

switching-command receiving unit for selecting from a plurality of computers a desired computer other than a computer, which is currently actively connected with said input device, and for receiving a switching command, which activates connection between said desired computer and said input device, from said computer, which is currently actively connected with said input device, and switching unit for activating connection from said input device to said computer corresponding to the switching command after the switching command is received, wherein data to be indicated on screens of display devices respectively corresponding to said plurality of computers are simultaneously and collectively indicated on the screen of said display device for at least one of said plurality of computers, and wherein said switching-command receiving unit receives the switching command when said desired computer is selected according to the data, which are simultaneously and collectively indicated on the screen of said display device for said computer that is currently actively connected with said input device.

2. The computer switch according to claim 1, wherein the switching command is transmitted from said computer, which is currently actively connected with said input device, when a switching instruction is issued from said input device.

3. The computer switch according to claim 1, which further comprises a connecting-channel identifier storing unit for storing a connecting-channel identifier.

4. The computer switch according to claim 3, wherein data represented by the connecting-channel identifier is indicated on a screen of a display device for said computer, which is currently actively connected with said input device, when said computer, which is currently actively connected with said input device, receives the connecting-channel identifier.

5. The computer switch according to claim 4, wherein said switching-command receiving unit receives the switching command when said desired computer is selected according to the data represented by the connecting-channel identifier, wherein the data includes the connecting-channel identifier of the desired computer and the data is indicated on the screen of said display device of said computer that is currently actively connected with said input device.

6. The computer switch according to claim 1, wherein data to be indicated on screens of display devices respectively corresponding to said plurality of computers are simultaneously and collectively indicated on the screen of said display device for at least one of said plurality of computers.

7. A computer switch for connecting an input device to a plurality of computers, comprising:

connecting-channel identifier acquisition command receiving unit for receiving from a computer, which is currently actively connected with said input device, a switching command that includes a connecting-channel identifier acquisition command, which activates connection between a desired computer and said input device, from said computer, which is currently actively connected with said input device, and requests acquisition of a connecting channel identifier corresponding to a connecting channel for said desired computer that is desired to be actively connected with said input device, wherein said receiving unit receives the switching command when data to be indicated on screens of display devices respectively corresponding to said plurality of computers are simultaneously and collectively indicated on a screen of a display device for said computer that is currently actively connected with said input device and said desired computer is selected according to said data, and connecting-channel identifier acquisition command receiving unit for transmitting the corresponding connecting channel identifier to the computer, which is currently actively connected with said input device, after the connecting-channel identifier acquisition command is received and activating connection from said input device to said desired computer corresponding to the switching command after the switching command is received, wherein a software program preinstalled in each of the plurality of computers facilitates a connecting channel identification operation to enable data acquisition in the computers.

8. A computer switch for connecting an input device to a plurality of computers, comprising:

first receiving unit for receiving a switching command that includes a data acquisition command, which is transmitted from a first computer so that said first computer acquires data retained by a second computer, which is other than said first computer of said plurality of computers, and a computer identifier corresponding to said second computer from said first computer, wherein said receiving unit receives the switching command when data to be indicated on screens of display devices respectively corresponding to said plurality of computers are simultaneously and collectively indicated on a screen of a display device for said first computer that is currently actively connected with said input device and said second computer is selected according to said data;

first transmitting unit for activating connection from said input device to said second computer corresponding to the switching command after the switching command is received and for transmitting the switching command that includes the data acquisition command to said second computer after the computer identifier and the data acquisition command are received;

second receiving unit for receiving from said second computer the data retained by said second computer after said second computer receives the data acquisition command; and second transmitting unit for transmitting the data retained by said second computer to said first computer after the data is received;

wherein a software program preinstalled in each of the plurality of computers facilitates a connecting channel identification operation to enable data acquisition in the computers.

* * * * *

UNITED STATES PATENT AND TRADEMARK OFFICE

CERTIFICATE OF CORRECTION

PATENT NO. : 6,934,792 B1
APPLICATION NO. : 09/715194
DATED : August 23, 2005
INVENTOR(S) : Mitsuaki Nakazawa et al.

It is certified that error appears in the above-identified patent and that said Letters Patent is hereby corrected as shown below:

Column 20, line 43, delete "," and insert -- ; --.

Column 21, line 40, delete "," and insert -- ; --.

Column 22, line 39, delete "," and insert -- ; --.

Signed and Sealed this

Eighteenth Day of July, 2006

JON W. DUDAS
*Director of the United States Patent and Trademark Office*